(12) United States Patent
Wang et al.

(10) Patent No.: US 11,368,962 B2
(45) Date of Patent: Jun. 21, 2022

(54) BEAM MANAGEMENT WITH MULTI-TRANSMISSION RECEPTION POINT MULTI-PANEL OPERATION

(71) Applicant: Intel IP Corporation, Santa Clara, CA (US)

(72) Inventors: Guotong Wang, Beijing (CN); Yushu Zhang, Beijing (CN); Alexei Davydov, Nizhny Novgorod (RU); Gang Xiong, Portland, OR (US); Wook Bong Lee, Pleasanton, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/465,209

(22) PCT Filed: Jun. 15, 2018

(86) PCT No.: PCT/US2018/037838
§ 371 (c)(1),
(2) Date: May 30, 2019

(87) PCT Pub. No.: WO2018/232294
PCT Pub. Date: Dec. 20, 2018

(65) Prior Publication Data
US 2020/0107327 A1    Apr. 2, 2020

Related U.S. Application Data

(60) Provisional application No. 62/521,243, filed on Jun. 16, 2017.

(51) Int. Cl.
*H04W 72/08* (2009.01)
*H04B 7/06* (2006.01)
(Continued)

(52) U.S. Cl.
CPC ........ *H04W 72/082* (2013.01); *H04B 7/0626* (2013.01); *H04B 7/0695* (2013.01);
(Continued)

(58) Field of Classification Search
CPC .... H04B 7/063; H04B 7/0626; H04B 7/0632; H04B 7/0695; H04B 7/088; H04B 7/0874;
(Continued)

(56) References Cited

U.S. PATENT DOCUMENTS

2015/0282122 A1* 10/2015 Kim .............. H04B 7/0408
370/329
2016/0226640 A1* 8/2016 Seol .............. H04B 7/0695
(Continued)

FOREIGN PATENT DOCUMENTS

WO    WO-2017196612 A1 * 11/2017    ........... H04B 7/0695

OTHER PUBLICATIONS

European Patent Office—Article 94(3) dated Sep. 15, 2020 from European Patent Application No. 18738129.8, 5 pages.
(Continued)

*Primary Examiner* — Rina C Pancholi
(74) *Attorney, Agent, or Firm* — Schwabe, Williamson & Wyatt, P.C.

(57) ABSTRACT

An apparatus is configured to be employed within a base station. The apparatus comprises baseband circuitry which includes a radio frequency (RF) interface and one or more processors. The one or more processors are configured to generate one or more signals for transmission to a user equipment (UE) device, wherein the UE device has a plurality of antenna panels; receive a beam state report from the RF interface from the UE device; select beams for communication with one or more of the plurality of antenna panels based on the received beam state report.

12 Claims, 11 Drawing Sheets

(51) Int. Cl.
*H04B 7/08* (2006.01)
*H04J 3/06* (2006.01)
*H04L 5/00* (2006.01)
*H04W 72/04* (2009.01)

(52) U.S. Cl.
CPC ............ *H04B 7/088* (2013.01); *H04J 3/0638* (2013.01); *H04L 5/0032* (2013.01); *H04L 5/0051* (2013.01); *H04W 72/044* (2013.01)

(58) Field of Classification Search
CPC .. H04L 5/0051; H04L 5/0032; H04W 72/082; H04W 72/044
See application file for complete search history.

(56) References Cited

U.S. PATENT DOCUMENTS

2018/0006702 A1* 1/2018 Doostnejad ............ H04B 7/088
2020/0195332 A1* 6/2020 Kakishima ............ H04L 5/0051

OTHER PUBLICATIONS

International Preliminary Report on Patentability dated Dec. 26, 2019 for PCT Application PCT/US2018/037838.
International Search Report and Written Opinion dated Nov. 16, 2018 for PCT Application PCT/US2018/037838.

* cited by examiner

| BPL INDEX/ TX BEAM INDEX | GROUP ID | PROCESS ID | RSRP |
|---|---|---|---|

BEAM REPORTING FORMAT WITH PROCESS ID

| RSRP [dBm] | | TRP 1 | | | TRP 2 | | |
|---|---|---|---|---|---|---|---|
| | | Beam 1 | Beam 2 | Beam 3 | Beam 1 | Beam 2 | Beam 3 |
| PANEL 1 | Beam 1 | | -103 | | | | |
| | Beam 2 | -100 | -90 | -99 | | | |
| | Beam 3 | | -94 | | | | |
| PANEL 2 | Beam 1 | | | | -99 | | |
| | Beam 2 | | | | -92 | -102 | |
| | Beam 3 | | | | -105 | | |

RSRP FOR DIFFERENT BEAMS BEFORE UE'S ROTATION

| RSRP [dBm] | | TRP 1 | | | TRP 2 | | |
|---|---|---|---|---|---|---|---|
| | | Beam 1 | Beam 2 | Beam 3 | Beam 1 | Beam 2 | Beam 3 |
| PANEL 1 | Beam 1 | | | | -99 | | |
| | Beam 2 | | | | -94 | -102 | |
| | Beam 3 | | | | -105 | | |
| PANEL 2 | Beam 1 | | -107 | | | | |
| | Beam 2 | -110 | -92 | -99 | | | |
| | Beam 3 | | -99 | | | | |

RSRP FOR DIFFERENT BEAMS AFTER UE'S ROTATION

BEAM MANAGEMENT WITH MULTI-TRANSMISSION RECEPTION POINT MULTI-PANEL OPERATION

REFERENCE TO RELATED APPLICATIONS

This application is a National Phase entry application of International Patent Application No. PCT/US2018/037838 filed Jun. 15, 2018, which claims priority to Intenational Application PCT/CN2017/088747, filed Jun. 16, 2017 entitled "BEAM MANAGEMENT WITH MUTLI-TRANSMISSION RECEPTION POINT MULTI-PANEL OPERATION IN NEW RADIO"; International Application No. PCT/CN2017/098353, filed Aug. 21, 2017 and entitled "GROUP BASED BEAM REPORTING IN NEW RADIO SYSTEMS"; and U.S. Provisional Application No. 62/521,243, filed Jun. 16, 2017, entitled "GROUP BASED BEAM REPORTING IN NEW RADIO (NR)", and is hereby incorporated by reference in their entirties.

FIELD

Various embodiments generally relate to the field of wireless communications.

BACKGROUND

Wireless or mobile communication involves wireless communication between two or more devices. The communication requires resources to transmit data from one device to another and/or to receive data at one device from another.

The transmissions typically include a wanted signal and an unwanted signal. The unwanted signal is noise. The noise can be interference, other signals, and the like.

The noise interferes with and/or detracts from the wanted signal. In some examples, the noise can block out the wanted signal. In other examples, the noise degrades the wanted signal.

This interference can impact reliability, throughput, utilization of resources and the like for wireless communications.

What are needed are techniques to mitigate the noise and/or impact of noise for wireless communication systems.

BRIEF DESCRIPTION OF THE DRAWINGS

FIG. 9 is a table illustrating received power for a communication system in accordance with some embodiments.

FIG. 10 is a table illustrating received power for a communication system after rotation in accordance with some embodiments.

DETAILED DESCRIPTION

Figure 1:
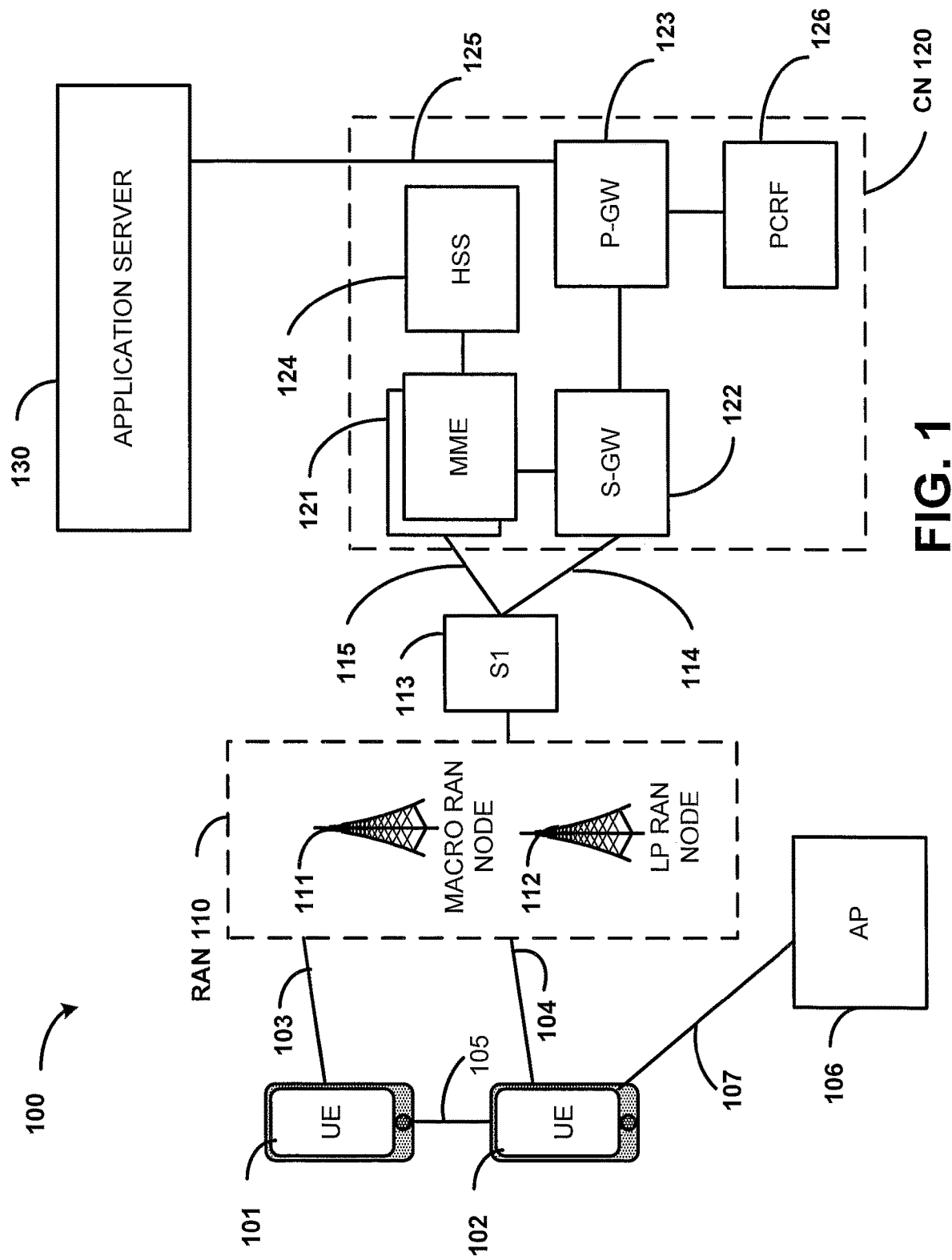
FIG. 1 illustrates a block diagram of an example wireless communications network environment for a network device (e.g., a UE, gNB or an eNB) according to various aspects or embodiments.

The present disclosure will now be described with reference to the attached drawing figures, wherein like reference numerals are used to refer to like elements throughout, and wherein the illustrated structures and devices are not necessarily drawn to scale. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. Embodiments herein may be related to RANI and 5G.

As utilized herein, terms "component," "system," "interface," and the like are intended to refer to a computer-related entity, hardware, software (e.g., in execution), and/or firmware. For example, a component can be a processor, a process running on a processor, a controller, an object, an executable, a program, a storage device, and/or a computer with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It is appreciated that there is a continuing need to improve data rates, reliability and performance. These techniques include phase noise compensation, including phase noise compensation for diversity based communications.

Wireless communication systems can involve nodes, such as a base station, communicating with devices, such as user equipment (UE) devices. The nodes can also include evolved Node Bs (eNBs), gNBs, and the like. The systems utilize downlink (DL) communications/transmissions from the base stations to the UE devices and uplink (UL) communications/transmissions from the UE devices to the base stations. Various techniques and schemes can be used for uplink and downlink communications.

In 5G, new radio (NR) systems, beam forming can be used at both the Transmission Reception Point (TRP or TRxP) side and the UE side. Generally, beam management is used to acquire and maintain TRP and UE beams for communication. The beam management generally includes measuring reference signals and selecting transmit (Tx) and/or receive (Rx) beams. The beam management can also include beam indication, where Tx and/or Rx are indicated to be used.

For downlink communications, the beam management procedures can include: P-1, P-2 and P-3. P-1 is used to obtain the initial TRP Tx beam and UE Rx beam. P-2 is used to enable TRP Tx beam refinement. P-3 is used to enable the UE Rx beam refinement.

For downlink beam management P-1, the TRP periodically broadcasts beamformed reference signals, such as, for example, channel-state information reference signals (CSI-RS). The UE measures the reference signals.

After measurement, the UE can determine and/or report which Tx beams are suitable for communications to the TRP. Further, the UE can send reporting content that includes a Tx beam index or beam pair link (BPL) index and the RSRP. The overhead for beam state reporting could be high, considering the large number of beams. In order to reduce this overhead, group based beam reporting has been proposed which have two options. A first option/approach is to use a receive (Rx) beam set based reporting (Alt 1), in which different Tx beams reported for the same set can be simultaneously received by the UE. A second solution/approach is Rx antenna group/antenna panel based reporting (Alt 2), where different Tx beams reported from different panels can be simultaneously received by the UE.

It is appreciated that some UEs with multiple antenna panels may switch among different antenna panels to perform measurement on network beams. Thus, the number of transceiver units (TxRUs) may be less than the number of antenna panels. In this situation, a process ID can be introduced for group based reporting. Groups sharing the same process ID indicates or identify those groups that can be active simultaneously at the UE side/device. Thus the network side (gNB, TRP and the like) could know which beams could be received at the same time by the UE and a gNB can then select transmit (Tx) beams to be utilized simultaneously for higher rank transmission.

Another approach to beam selection/measurement is a matrix based approach. Here, a UE reports Tx beams based on UE antenna panels and each group contains Tx beams observed per panel. Thus, a matrix of Tx beams is reported to a gNB (or other entity on the network side). The gNB measures and/or performs beam indication and can reconstruct groups. For example, the gNB can pick one Tx beam from each panel, using the group index for beam indication. When reconstructing the groups, the gNB and the UE side follow the same rules or analysis. Thus, different grouping criteria is utilized for beam reporting and beam indication. For example, for beam reporting, the grouping is based on UE antenna panel (Alt 2), and for beam indication, the grouping criteria is based on UE Rx beam set (Alt 1).

For the case where the number of UE TxRUs is less than the number of UE antenna panels, the UE can indicate how many sub-matrixes the matrix can be divided into. The groups within the same sub-matrix an be active at the same time. Thus, the beam indication overhead can be reduced. Meanwhile, the flexibility of Alt 2 can be maintained for beam reporting.

Additionally, from the uplink (UL) prospective, the UE can inform the TRP which antenna panels can be active simultaneously so that the TRP can select proper UE Tx beams for higher rank transmissions in uplink. Additional description of these approaches is provided below.

Embodiments are disclosed that facilitate group based beam reporting and beam formation. The embodiments can include a process identification (ID) used for group based beam reporting. The process ID indicates that groups with the same process ID can be active simultaneously at the UE side so that the gNB can select proper/suitable Tx beams to be utilized, simultaneously, for higher rank transmissions. For matrix based beam reporting and beam indication, the UE can further indicate the number of sub-matrix(es) a reported Tx beam matrix can be divided into. Thus the gNB could select proper/suitable Tx beams.

Furthermore, in NR, multi-TRP and multi-panel operation can be used when a UE device has multiple antenna panels. For example, with multiple antenna panels the UE can maintain communication links with different TRP via the different antenna panels. For downlink communications, multiple TRPs can send different data and the UE can receive the various downlink signals using the different antenna panels. As a result, the number of layers can be increased and some throughput gain can be obtained. Similarly for uplink communications, the UE can transmit different uplink signals from different antenna panels and to different target/receiving TRP for each signal, which can increase throughput.

Embodiments are also discloses that coordinate among TRPs for multi-TRP and/or multi-panel operation to facilitate performance of beam management. For example, a UE device may sweep (or rotate) several beams across different antennal panels to refine the UE Tx/RX beam targeting to a TRP. Coordination among the TRPs allows performing the beam management procedure at the same time. Alternatively, communication with other TRPs can be interrupted and a configuration of the UE with a gap(s) to allow the UE to perform measurement(s).

FIG. 1 illustrates an architecture of a system 100 of a network in accordance with some embodiments. The system 100 is shown to include a user equipment (UE) 101 and a UE 102. The UEs 101 and 102 are illustrated as smartphones (e.g., handheld touchscreen mobile computing devices connectable to one or more cellular networks), but can also comprise any mobile or non-mobile computing device, such as Personal Data Assistants (PDAs), pagers, laptop computers, desktop computers, wireless handsets, or any computing device including a wireless communications interface.

In some embodiments, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data can be a machine-initiated exchange of data. An IoT network describes interconnecting IoT UEs, which can include uniquely identifiable embedded computing devices (within the Internet infrastructure), with short-lived connections. The IoT UEs can execute background applications (e.g., keep-alive messages, status updates, etc.) to facilitate the connections of the IoT network.

The UEs 101 and 102 can be configured to connect, e.g., communicatively couple, with a radio access network (RAN) 110—the RAN 110 can be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 can further directly exchange communication data via a ProSe interface 105. The ProSe interface 105 can alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). A network device as referred to herein can include any one of these APs, ANs, UEs or any other network component. The RAN 110 can include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink (UL) and downlink (DL) dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this can represent the smallest quantity of resources that currently can be allocated. There are several different physical downlink channels that are conveyed using such resource blocks.

The physical downlink shared channel (PDSCH) can carry user data and higher-layer signaling to the UEs 101 and 102. The physical downlink control channel (PDCCH) can carry information about the transport format and resource allocations related to the PDSCH channel, among other things. It is appreciated that an MTC physical downlink control channel (MPDCCH) and/or an enhanced physical downlink control channel (EPDCCH) can be used in placed of the PDCCH. The It can also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) can be performed at any of the RAN nodes 111 and 112 based on channel quality information fed back from any of the UEs 101 and 102. The downlink resource assignment information can be sent on the PDCCH used for (e.g., assigned to) each of the UEs 101 and 102.

The PDCCH can use control channel elements (CCEs) to convey the control information. Before being mapped to resource elements, the PDCCH complex-valued symbols can first be organized into quadruplets, which can then be permuted using a sub-block interleaver for rate matching. Each PDCCH can be transmitted using one or more of these CCEs, where each CCE can correspond to nine sets of four physical resource elements known as resource element groups (REGs). Four Quadrature Phase Shift Keying (QPSK) symbols can be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments can use concepts for resource allocation for control channel information that are an extension of the above-described concepts. For example, some embodiments can utilize an enhanced physical downlink control channel (EPDCCH) that uses PDSCH resources for control information transmission. The EPDCCH can be transmitted using one or more enhanced control channel elements (ECCEs). Similar to above, each ECCE can correspond to nine sets of four physical resource elements known as an enhanced resource element groups (EREGs). An ECCE can have other numbers of EREGs in some situations.

The RAN 110 is shown to be communicatively coupled to a core network (CN) 120—via an S1 interface 113. In embodiments, the CN 120 can be an evolved packet core (EPC) network, a NextGen Packet Core (NPC) network, or some other type of CN. In this embodiment the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124.

The MMEs 121 can be similar in function to the control plane of legacy Serving General Packet Radio Service (GPRS) Support Nodes (SGSN). The MMEs 121 can manage mobility aspects in access such as gateway selection and tracking area list management. The HSS 124 can comprise a database for network users, including subscription-related information to support the network entities' handling of communication sessions. The CN 120 can comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 can terminate the S1 interface 113 towards the RAN 110, and routes data packets between the RAN 110 and the CN 120. In addition, the S-GW 122 can be a local mobility anchor point for inter-RAN node handovers and also can provide an anchor for inter-3GPP mobility. Other responsibilities can include lawful intercept, charging, and some policy enforcement.

The P-GW 123 can terminate an SGi interface toward a PDN. The P-GW 123 can route data packets between the CN network 120 and external networks such as a network including the application server 130 (alternatively referred to as application function (AF)) via an Internet Protocol (IP) interface 125. Generally, the application server 130 can be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 can further be a node for policy enforcement and charging data collection. Policy and Charging Enforcement Function (PCRF) 126 is the policy and charging control element of the CN 120. In a non-roaming scenario, there can be a single PCRF in the Home Public Land Mobile Network (HPLMN) associated with a UE's Internet Protocol Connectivity Access Network (IP-CAN) session. In a roaming scenario with local breakout of traffic, there can be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 can be communicatively coupled to the application server 130 via the P-GW 123. The application server 130 can signal the PCRF 126 to indicate a new service flow and select the appropriate Quality of Service (QoS) and charging parameters. The PCRF 126 can provision this rule into a Policy and Charging Enforcement Function (PCEF) (not shown) with the appropriate traffic flow template (TFT) and QoS class of identifier (QCI), which commences the QoS and charging as specified by the application server 130.

In one or more embodiments, IMS services can be identified more accurately in a paging indication, which can enable the UEs 101, 102 to differentiate between PS paging and IMS service related paging. As a result, the UEs 101, 102 can apply preferential prioritization for IMS services as desired based on any number of requests by any application, background searching (e.g., PLMN searching or the like), process, or communication. In particular, the UEs 101, 102 can differentiate the PS domain paging to more distinguishable categories, so that IMS services can be identified clearly in the UEs 101, 102 in comparison to PS services. In addition to a domain indicator (e.g., PS or CS), a network (e.g., CN 120, RAN 110, AP 106, or combination thereof as an eNB or the other network device) can provide further, more specific information with the TS 36.331-Paging message, such as a "paging cause" parameter. The UE can use this information to decide whether to respond to the paging, possibly interrupting some other procedure like an ongoing PLMN search.

In one example, when UEs 101, 102 can be registered to a visited PLMN (VPLMN) and performing PLMN search (i.e., background scan for a home PLMN (HPLMN) or a higher priority PLMN), or when a registered UE is performing a manual PLMN search, the PLMN search can be interrupted in order to move to a connected mode and respond to a paging operation as part of a MT procedure/operation. Frequently, this paging could be for PS data (non-IMS data), where, for example, an application server 130 in the NW wants to push to the UE 101 or 102 for one of the many different applications running in/on the UE 101 or 102, for example. Even though the PS data could be delay tolerant and less important, in legacy networks the paging is often not able to be ignored completely, as critical services like an IMS call can be the reason for the PS paging. The multiple interruptions of the PLMN search caused by the paging can result in an unpredictable delay of the PLMN search or in the worst case even in a failure of the procedure, resulting in a loss of efficiency in network communication operations. A delay in moving to or handover to a preferred PLMN (via manual PLMN search or HPLMN search) in a roaming condition can incur more roaming charges on a user as well.

Figure 2:
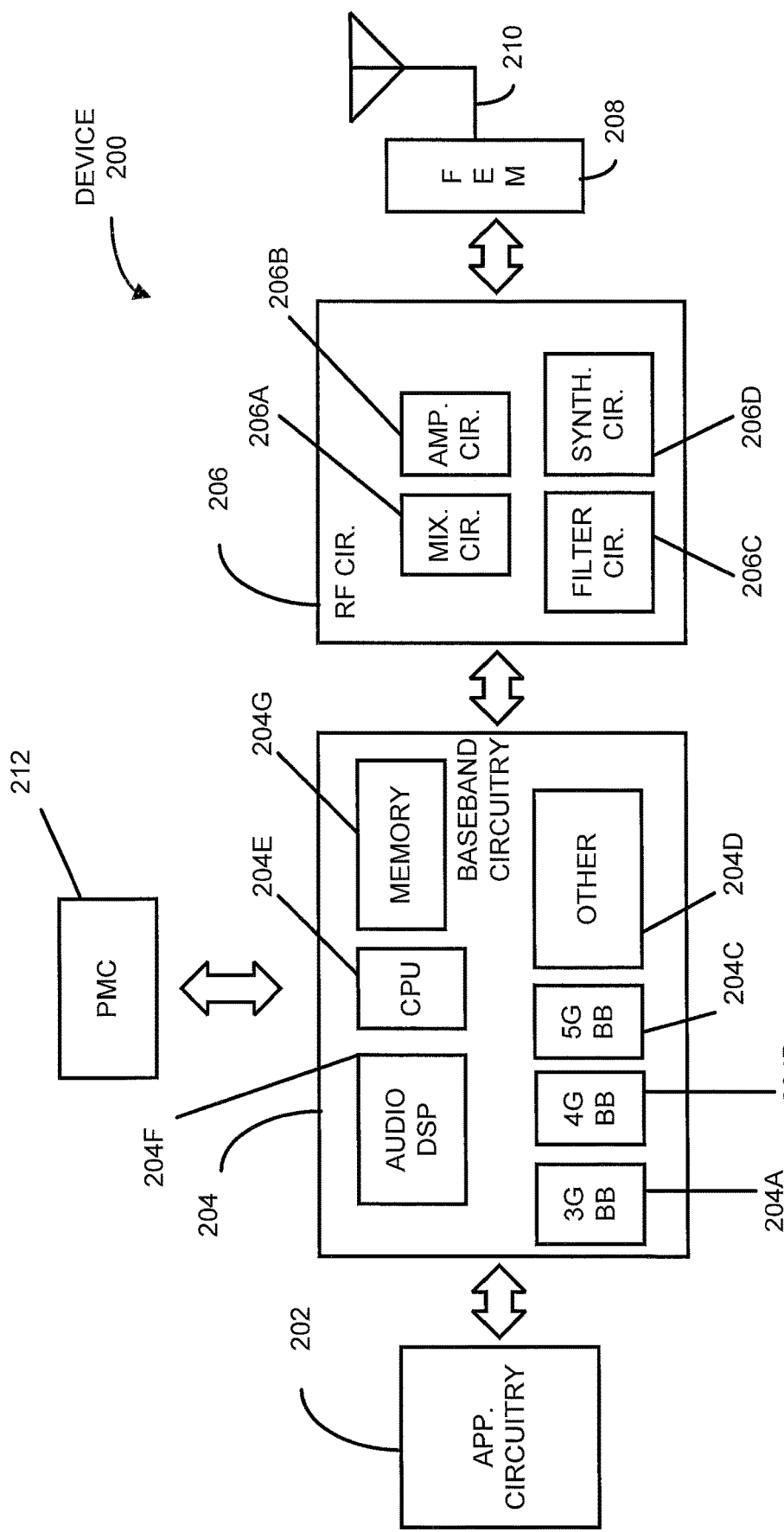
FIG. 2 illustrates another block diagram of an example of wireless communications network environment for a network device (e.g., a UE, gNB or an eNB) according to various aspects or embodiments.

FIG. 2 illustrates example components of a network device 200 in accordance with some embodiments. In some embodiments, the device 200 can include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 can be included in a UE 101, 102 or a RAN node 111, 112, AP, AN, eNB or other network component. In some embodiments, the device 200 can include less elements (e.g., a RAN node can not utilize application circuitry 202, and instead include a processor/controller to process IP data received from an EPC). In some embodiments, the network device 200 can include additional elements such as, for example, memory/storage, display, camera, sensor, or input/output (I/O) interface. In other embodiments, the components described below can be included in more than one device (e.g., said circuitries can be separately included in more than one device for Cloud-RAN (C-RAN) implementations).

The application circuitry 202 can include one or more application processors. For example, the application circuitry 202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 200. In some embodiments, processors of application circuitry 202 can process IP data packets received from an EPC.

The baseband circuitry 204 can include circuitry such as, but not limited to, one or more single-core or multi-core processors. The baseband circuitry 204 can include one or more baseband processors or control logic to process baseband signals received from a receive signal path of the RF circuitry 206 and to generate baseband signals for a transmit signal path of the RF circuitry 206. Baseband processing circuity 204 can interface with the application circuitry 202 for generation and processing of the baseband signals and for controlling operations of the RF circuitry 206. For example, in some embodiments, the baseband circuitry 204 can include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), si2h generation (6G), etc.). The baseband circuitry 204 (e.g., one or more of baseband processors 204A-D) can handle various radio control functions that enable communication with one or more radio networks via the RF circuitry 206. In other embodiments, some or all of the functionality of baseband processors 204A-D can be included in modules stored in the memory 204G and executed via a Central Processing Unit (CPU) 204E. The radio control functions can include, but are not limited to, signal modulation/demodulation, encoding/decoding, radio frequency shifting, etc. In some embodiments, modulation/demodulation circuitry of the baseband circuitry 204 can include Fast-Fourier Transform (FFT), precoding, or constellation mapping/demapping functionality. In some embodiments, encoding/decoding circuitry of the baseband circuitry 204 can include convolution, tail-biting convolution, turbo, Viterbi, or Low Density Parity Check (LDPC) encoder/decoder functionality. Embodiments of modulation/demodulation and encoder/decoder functionality are not limited to these examples and can include other suitable functionality in other embodiments.

In some embodiments, the baseband circuitry 204 can include one or more audio digital signal processor(s) (DSP) 204F. The audio DSP(s) 204F can be include elements for compression/decompression and echo cancellation and can include other suitable processing elements in other embodiments. Components of the baseband circuitry can be suitably combined in a single chip, a single chipset, or disposed on a same circuit board in some embodiments. In some embodiments, some or all of the constituent components of the baseband circuitry 204 and the application circuitry 202 can be implemented together such as, for example, on a system on a chip (SOC).

In some embodiments, the baseband circuitry 204 can provide for communication compatible with one or more radio technologies. For example, in some embodiments, the baseband circuitry 204 can support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 204 is configured to support radio communications of more than one wireless protocol can be referred to as multi-mode baseband circuitry.

RF circuitry 206 can enable communication with wireless networks using modulated electromagnetic radiation through a non-solid medium. In various embodiments, the RF circuitry 206 can include switches, filters, amplifiers, etc. to facilitate the communication with the wireless network. RF circuitry 206 can include a receive signal path which can include circuitry to down-convert RF signals received from the FEM circuitry 208 and provide baseband signals to the baseband circuitry 204. RF circuitry 206 can also include a transmit signal path which can include circuitry to up-convert baseband signals provided by the baseband circuitry 204 and provide RF output signals to the FEM circuitry 208 for transmission.

In some embodiments, the receive signal path of the RF circuitry 206 can include mixer circuitry 206a, amplifier circuitry 206b and filter circuitry 206c. In some embodiments, the transmit signal path of the RF circuitry 206 can include filter circuitry 206c and mixer circuitry 206a. RF circuitry 206 can also include synthesizer circuitry 206d for synthesizing a frequency for use by the mixer circuitry 206a of the receive signal path and the transmit signal path. In some embodiments, the mixer circuitry 206a of the receive signal path can be configured to down-convert RF signals received from the FEM circuitry 208 based on the synthesized frequency provided by synthesizer circuitry 206d. The amplifier circuitry 206b can be configured to amplify the down-converted signals and the filter circuitry 206c can be a low-pass filter (LPF) or band-pass filter (BPF) configured to remove unwanted signals from the down-converted signals to generate output baseband signals. Output baseband signals can be provided to the baseband circuitry 204 for further processing. In some embodiments, the output baseband signals can be zero-frequency baseband signals, although this is not a requirement. In some embodiments, mixer circuitry 206a of the receive signal path can comprise passive mixers, although the scope of the embodiments is not limited in this respect.

In some embodiments, the mixer circuitry 206a of the transmit signal path can be configured to up-convert input baseband signals based on the synthesized frequency provided by the synthesizer circuitry 206d to generate RF output signals for the FEM circuitry 208. The baseband signals can be provided by the baseband circuitry 204 and can be filtered by filter circuitry 206c.

In some embodiments, the mixer circuitry 206a of the receive signal path and the mixer circuitry 206a of the transmit signal path can include two or more mixers and can be arranged for quadrature downconversion and upconversion, respectively. In some embodiments, the mixer circuitry 206a of the receive signal path and the mixer circuitry 206a of the transmit signal path can include two or more mixers and can be arranged for image rejection (e.g., Hartley image rejection). In some embodiments, the mixer circuitry 206a of the receive signal path and the mixer circuitry 206a can be arranged for direct downconversion and direct upconversion, respectively. In some embodiments, the mixer circuitry 206a of the receive signal path and the mixer circuitry 206a of the transmit signal path can be configured for super-heterodyne operation.

In some embodiments, the output baseband signals and the input baseband signals can be analog baseband signals, although the scope of the embodiments is not limited in this respect. In some alternate embodiments, the output baseband signals and the input baseband signals can be digital baseband signals. In these alternate embodiments, the RF circuitry 206 can include analog-to-digital converter (ADC) and digital-to-analog converter (DAC) circuitry and the baseband circuitry 204 can include a digital baseband interface to communicate with the RF circuitry 206.

In some dual-mode embodiments, a separate radio IC circuitry can be provided for processing signals for each spectrum, although the scope of the embodiments is not limited in this respect.

In some embodiments, the synthesizer circuitry 206d can be a fractional-N synthesizer or a fractional N/N+1 synthesizer, although the scope of the embodiments is not limited in this respect as other types of frequency synthesizers can be suitable. For example, synthesizer circuitry 206d can be a delta-sigma synthesizer, a frequency multiplier, or a synthesizer comprising a phase-locked loop with a frequency divider.

The synthesizer circuitry 206d can be configured to synthesize an output frequency for use by the mixer circuitry 206a of the RF circuitry 206 based on a frequency input and a divider control input. In some embodiments, the synthesizer circuitry 206d can be a fractional N/N+1 synthesizer.

In some embodiments, frequency input can be provided by a voltage controlled oscillator (VCO), although that is not a requirement. Divider control input can be provided by either the baseband circuitry 204 or the applications processor 202 depending on the desired output frequency. In some embodiments, a divider control input (e.g., N) can be determined from a look-up table based on a channel indicated by the applications processor 202.

Synthesizer circuitry 206d of the RF circuitry 206 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 206 can include an IQ/polar converter.

FEM circuitry 208 can include a receive signal path which can include circuitry configured to operate on RF signals received from one or more antennas 210, amplify the received signals and provide the amplified versions of the received signals to the RF circuitry 206 for further processing. FEM circuitry 208 can also include a transmit signal path which can include circuitry configured to amplify signals for transmission provided by the RF circuitry 206 for transmission by one or more of the one or more antennas 210. In various embodiments, the amplification through the transmit or receive signal paths can be done solely in the RF circuitry 206, solely in the FEM 208, or in both the RF circuitry 206 and the FEM 208.

In some embodiments, the FEM circuitry 208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 206). The transmit signal path of the FEM circuitry 208 can include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 can manage power provided to the baseband circuitry 204. In particular, the PMC 212 can control power-source selection, voltage scaling, battery charging, or DC-to-DC conversion. The PMC 212 can often be included when the device 200 is capable of being powered by a battery, for example, when the device is included in a UE. The PMC 212 can increase the power conversion efficiency while providing desirable implementation size and heat dissipation characteristics.

While FIG. 2 shows the PMC 212 coupled only with the baseband circuitry 204. However, in other embodiments, the PMC 212 can be additionally or alternatively coupled with, and perform similar power management operations for, other components such as, but not limited to, application circuitry 202, RF circuitry 206, or FEM 208.

In some embodiments, the PMC 212 can control, or otherwise be part of, various power saving mechanisms of the device 200. For example, if the device 200 is in an RRC_Connected state, where it is still connected to the RAN node as it expects to receive traffic shortly, then it can enter a state known as Discontinuous Reception Mode (DRX) after a period of inactivity. During this state, the device 200 can power down for brief intervals of time and thus save power.

If there is no data traffic activity for an extended period of time, then the device 200 can transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 does not receive data in this state, in order to receive data, it transitions back to RRC_Connected state.

An additional power saving mode can allow a device to be unavailable to the network for periods longer than a paging interval (ranging from seconds to a few hours). During this time, the device can be unreachable to the network and can power down completely. Any data sent during this time can incur a large delay with the delay presumed to be acceptable.

Processors of the application circuitry 202 and processors of the baseband circuitry 204 can be used to execute elements of one or more instances of a protocol stack. For example, processors of the baseband circuitry 204, alone or in combination, can be used execute Layer 3, Layer 2, or Layer 1 functionality, while processors of the application circuitry 204 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node. Each of these layers can be implemented to operate one or more processes or network operations of embodiments/aspects herein.

In addition, the memory 204G can comprise one or more machine-readable medium/media including instructions that, when performed by a machine or component herein cause the machine to perform acts of the method or of an apparatus or system for concurrent communication using multiple communication technologies according to embodiments and examples described herein. It is to be understood that aspects described herein can be implemented by hardware, software, firmware, or any combination thereof. When implemented in software, functions can be stored on or transmitted over as one or more instructions or code on a computer-readable medium (e.g., the memory described herein or other storage device). Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection can also be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium.

In general, there is a move to provide network services for the packet domain. The earlier network services like UMTS or 3G and predecessors (2G) configured a CS domain and a packet domain providing different services, especially CS services in the CS domain as well as voice services were considered to have a higher priority because consumers demanded an immediate response. Based on the domain that the paging was received, the device 200 could assign certain priority for the incoming transaction. Now with LTE/5G most services are moving to the packet domain. Currently, the UE (e.g., 101, 102, or device 200) can get paging for a packet service without knowing any further information about the paging of the MT procedure, such as whether someone is calling on a line, a VoIP call, or just some packet utilized from Facebook, other application service, or other similar MT service. As such, a greater opportunity exists for further delays without the possibility for the UE to discriminate between the different application packets that could initiate a paging and also give a different priority to it based on one or more user preferences. This can could be important for the UE because the UE might be doing other tasks more vital for resource allocation.

In one example, a UE (e.g., 101, 102, or device 200) could be performing a background search for other PLMNs. This is a task the UE device 200 could do in regular intervals if it is not connected on its own home PLMN or a higher priority PLMN, but roaming somewhere else. A higher priority could be a home PLMN or some other PLMNs according to a list provided by the provider or subscriber (e.g., HSS 124). Consequently, if a paging operation arrives as an MT service and an interruption results, such that a start and begin operation are executed, a sufficient frequency of these interruptions could cause the UE to never complete a background search in a reasonable way. This is one way where it would be advantageous for the UE or network device to know that the interruption is only a packet service, with no need to react to it immediately, versus an incoming voice call that takes preference immediately and the background scan should be postponed.

Additionally, the device 200 can be configured to connect or include multiple subscriber identity/identification module (SIM) cards/components, referred to as dual SIM or multi SIM devices. The device 200 can operate with a single transmit and receive component that can coordinate between the different identities from which the SIM components are operating. As such, an incoming voice call should be responded to as fast as possible, while only an incoming packet for an application could be relatively ignored in order to utilize resources for the other identity (e.g., the voice call or SIM component) that is more important or has a higher priority from a priority list/data set/or set of user device preferences, for example. This same scenario can also be utilized for other operations or incoming data, such as with a PLMN background search such as a manual PLMN search, which can last for a long period of time since, especially with a large number of different bands from 2G, etc. With an ever increasing number of bands being utilized in wireless communications, if paging interruptions come in between the operations already running without distinguishing between the various packet and real critical services such as voice, the network devices can interpret this manual PLMN search to serve and ensure against a drop or loss of any increment voice call, with more frequent interruptions in particular.

As stated above, even though in most of these cases the PS data is delay tolerant and less important, in legacy networks the paging cannot be ignored completely, as critical services like an IMS call can be the reason for the PS paging. The multiple interruptions of a PLMN search caused by the paging can result in an unpredictable delay of the PLMN search or in the worst case even in a failure of the procedure. Additionally, a delay in moving to preferred PLMN (via manual PLMN search or HPLMN search) in roaming condition can incur more roaming charges on user. Similarly, in multi-SIM scenario when UE is listening to paging channel of two networks simultaneously and has priority for voice service, a MT IMS voice call can be interpreted as "data" call as indicated in MT paging message and can be preceded by MT Circuit Switched (CS) paging of an other network or MO CS call initiated by user at same time. As such, embodiments/aspects herein can increase the call drop risk significantly for the SIM using IMS voice service.

In embodiments, 3GPP NW can provide further granular information about the kind of service the network is paging for. For example, the Paging cause parameter could indicate one of the following values/classes/categories: 1) IMS voice/video service; 2) IMS SMS service; 3) IMS other services (not voice/video/SMS-related; 4) any IMS service; 5) Other PS service (not IMS-related). In particular, a network device (e.g., an eNB or access point) could only be discriminating between IMS and non-IMS services could use 4) and 5), whereas a network that is able to discriminate between different types of IMS services (like voice/video call, SMS, messaging, etc.) could use 3) instead of 4) to explicitly indicate to the UE that the paging is for an IMS service different from voice/video and SMS. By obtaining this information UE may decide to suspend PLMN search only for critical services like incoming voice/video services.

In other aspects, dependent on the service category (e.g., values or classes 1-5 above), the UE 101, 102, or device 200 can memorize that there was a paging to which it did not respond, and access the network later, when the PLMN search has been completed and the UE decides to stay on the current PLMN. For example, if the reason for the paging was a mobile terminating IMS SMS, the MME can then inform the HSS (e.g., 124) that the UE is reachable again, and the HSS 124 can initiate a signaling procedure which will result in a delivery of the SMS to the UE once resources are more available or less urgent for another operation/application/or category, for example. To this purpose the UE 101, 102, or 200 could initiate a periodic tau area update (TAU) procedure if the service category in the Paging message indicated "IMS SMS service", for example.

Figure 3:
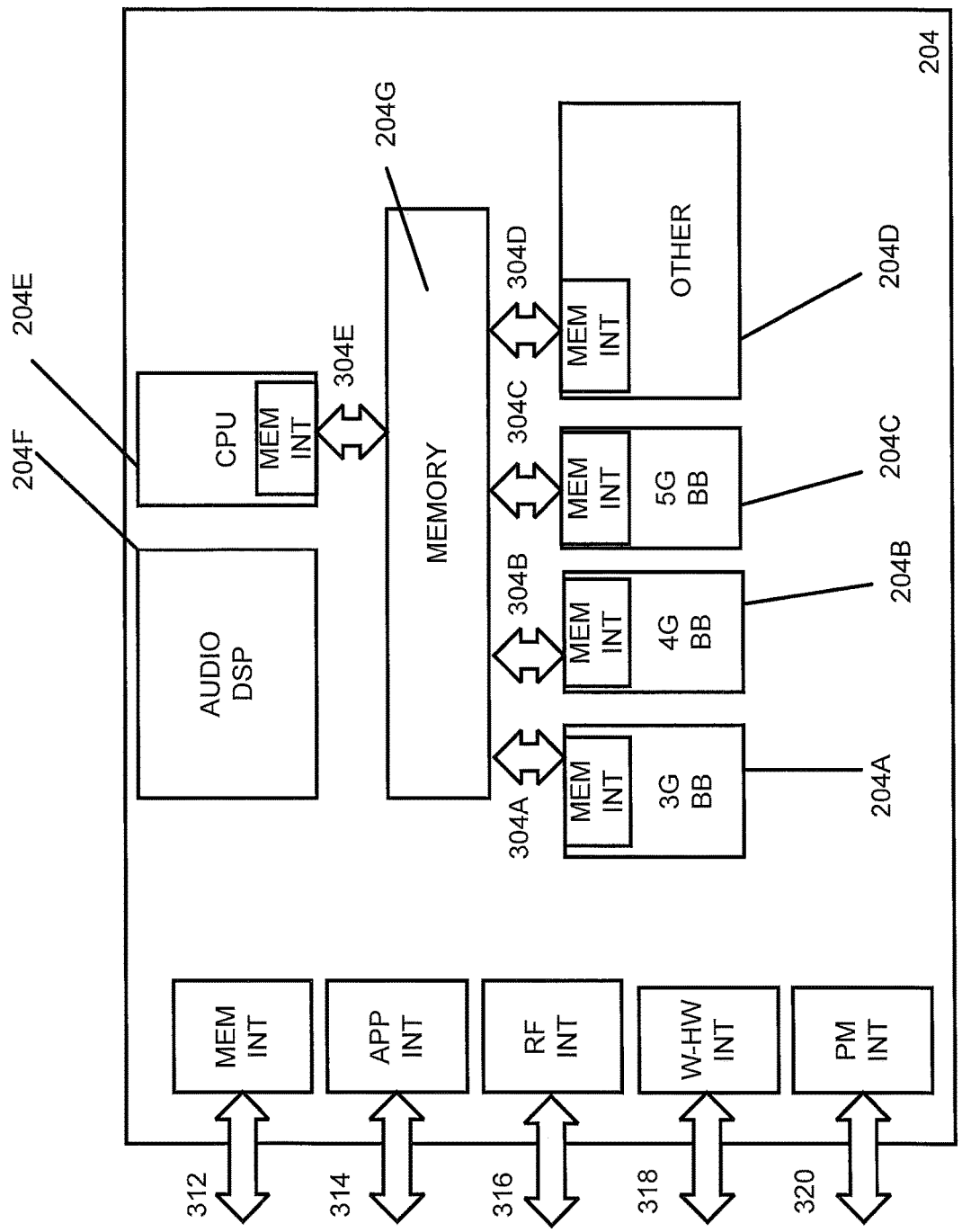
FIG. 3 another block diagram of an example of wireless communications network environment for network device (e.g., a UE, gNB or an eNB) with various interfaces according to various aspects or embodiments.

FIG. 3 illustrates example interfaces of baseband circuitry in accordance with some embodiments. As discussed above, the baseband circuitry 204 of FIG. 2 can comprise processors 204A-204E and a memory 204G utilized by said processors. Each of the processors 204A-204E can include a memory interface, 304A-304E, respectively, to send/receive data to/from the memory 204G.

The baseband circuitry 204 can further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212.

Figure 4:
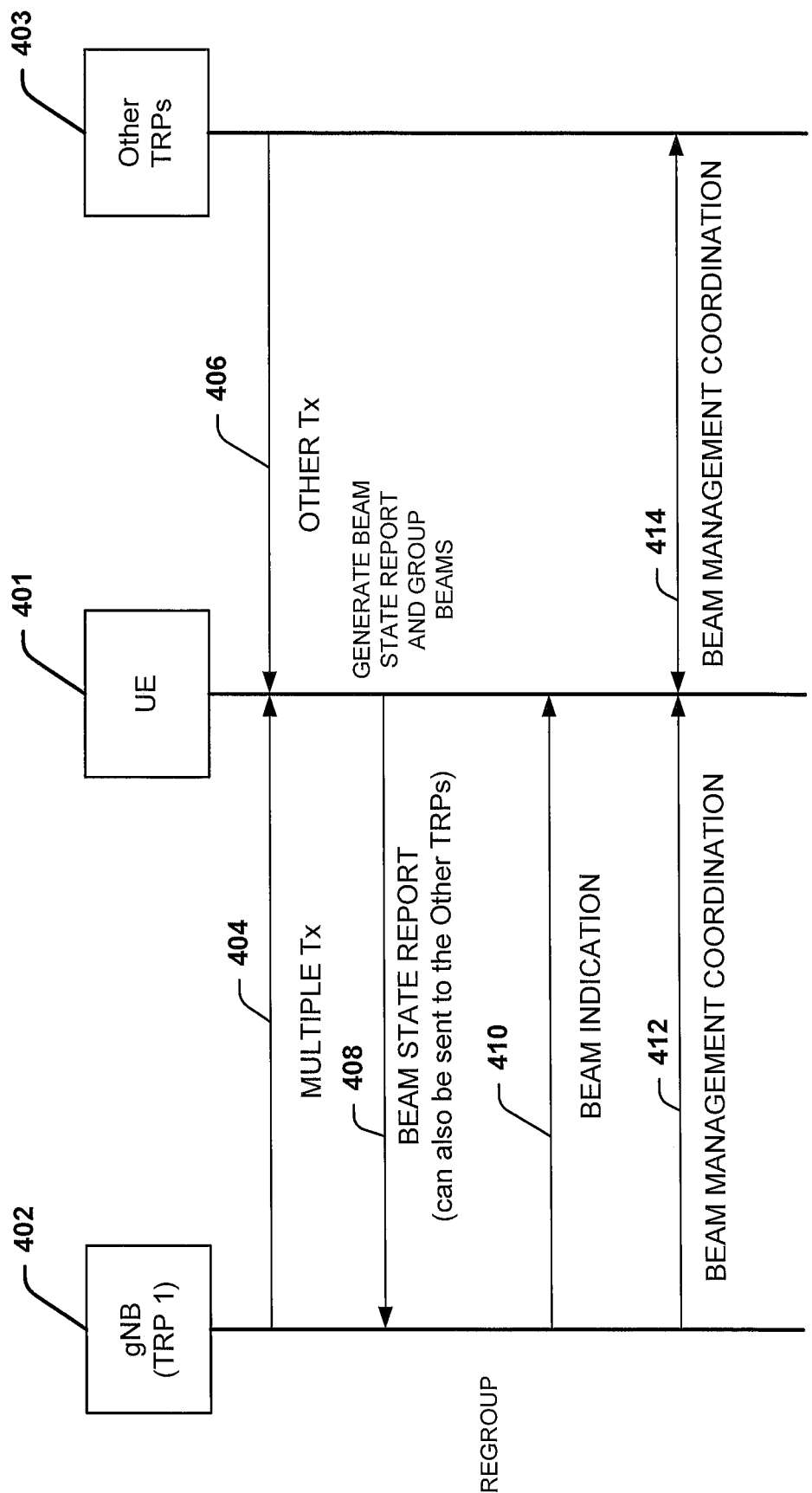
FIG. 4 is a diagram illustrating an architecture of a system that facilitates beam formation.

FIG. 4 is a diagram illustrating an architecture of a system 400 that facilitates beam formation. In accordance with some embodiments The system or apparatus 400 can be utilized with the above embodiments and variations thereof, including the system 100 described above. The system 400 is provided as an example and it is appreciated that suitable variations are contemplated.

The system 400 includes a network device 401 and a node 402. The device 401 is shown as a UE device and the node 402 is shown as gNB for illustrative purposes. It is appreciated that the UE device 401 can be other network devices, such as APs, ANs and the like. It is also appreciated that the gNB 402 can be other nodes or access nodes (ANs), such as a base station (BS), eNB, gNB, RAN nodes, UE and the like. Other network or network devices can be present and interact with the device 401 and/or the node 402. Operation of the device 401 and/or the node 402 can be performed by circuitry, such as the baseband circuitry 204, described above.

Generally, downlink (DL) transmissions occur from the gNB 402 to the UE 401 whereas uplink (UL) transmissions occur from the UE 401 to the gNB 402. The downlink transmissions typically utilize a DL control channel and a DL data channel. The uplink transmissions typically utilize an UL control channel and a UL data channel. The various channels can be different in terms of direction, link to another gNB, eNB and the like.

The node 402 can include one or more transmit receive points (TRPs) including a first TRP 1 as shown. The system 400 also includes one or more other TRPs 403. The other TRPs 403 can be associated with one or more other nodes, such as one or more gNBs.

The UE 401 is one of a set or group of UE devices assigned to or associated with a cell of the gNB 402. The UE 401 can be coupled to the first TRP 1 and the other TRPs 403. The TRP, also designated as TRPx, is a point or antenna array available to one or more entities of the network, such as gNB, base stations, nodes, and the like. In this example, the first TRP 1 is a TRP accessible by the node 402.

Figure 5:
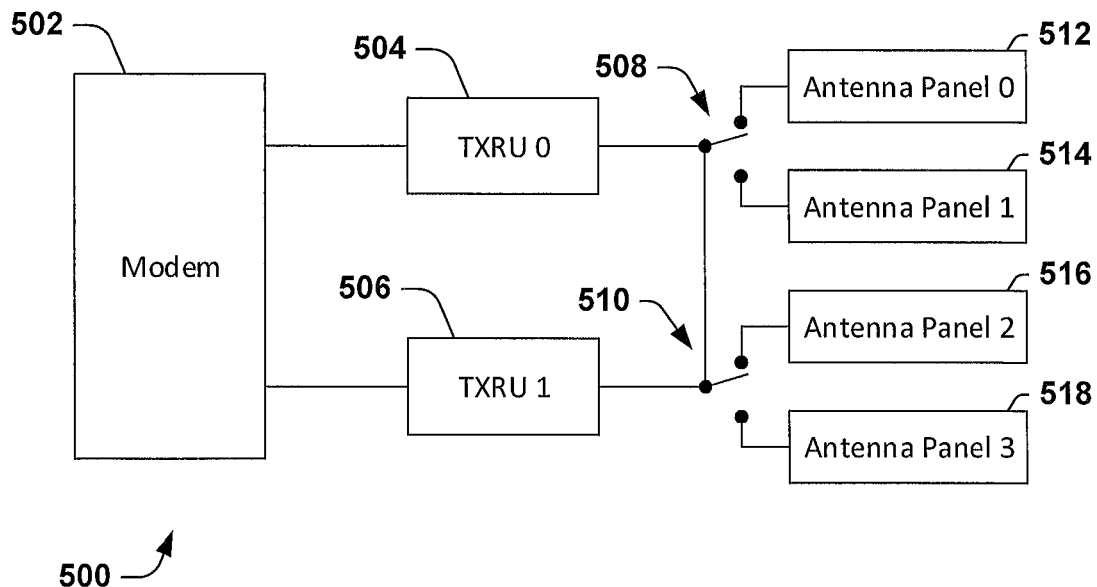
FIG. 5 illustrates an architecture of a system in accordance with some embodiments.

The UE 401 has one or more transceiver units (TxRUs) and one or more antenna panels, such as shown in FIG. 5. In one example, the UE 401 has a plurality of TxRUs. In another example, the UE 401 has a plurality of antenna panels.

The one or more TxRUs, in one example, each include a radio frequency (RF) unit and an analog to digital converter (ADC). The one or more TxRUs can each be connected to and/or associated with one or more antenna elements, antenna panels, and the like.

Thus, the UE 401 can receive communications from the TRP 1 and the other TRPs 403 at the same time using the TxRUs and/or the antenna panels.

The gNB 402 (or the TRP 1) generates a plurality or multiple of reference signals for transmission at 404. In one example, the reference signals are channel state information-reference signals (CSI-RS).

The UE 401 measures the reference signals and generates a beam state report based on the measurements, the TxRUs, the antenna panels and/or the like. The beam state report can include beam related information such as, a Tx beam index, beam pair link (BPL) index, a reference signal received power (RSRP), a process identification (ID), a group identification (ID), and/or the like.

The UE 401 can perform grouping for the beam state report using Alt 1 and Alt 2, as shown below.

Alternately, the UE 401 can be configured to generate the beam state report to include a matrix having sub matrixes, and groups based on the antenna panels and the like. Examples of generating the matrix are shown below.

The UE 401 transmits the beam state report at 408 to the gNB/TRP 1 402.

The gNB 402 can perform regrouping using the Alt 2 and/or variations thereof.

The beam state report can also be grouped using matrixes as described below.

The configuration/design for the beam state report can be predetermined, sent via messaging, sent via signaling, provided using control channels (such as PDCCH), provided by downlink control information (DCI), and the like.

The gNB 402 selects beams for communications and/or beam refinement. The beam refinement can include initial beam acquisition (P-1), transmit (Tx) beam refinement (P-2), or receive (Rx) beam refinement (P-3).

The gNB 402 can perform beam indication and notify the UE device 401 which Rx and/or Tx beams to use at 410. The notification can be provided by messaging, provided by signaling (such as higher layer signaling), provided using control channels (such as PDCCH), provided by downlink control information (DCI), and the like.

It is appreciated that the beam refinement or beam management procedure can be performed for downlink communications and/or uplink communications, based on the beam state report. Various examples of are provided below, It is appreciated that suitable variations of the examples are contemplated. Beam management at the UE 401 can referred to as UE side beam management and beam management at the gNB 402 can be referred to as gNB or TRP side beam management. Beam management includes UE side beam management and/or TRP side beam management.

The above beam management is described with regard to the UE 401 and the gNB 402. However, it is appreciated that the above beam management can be used with other nodes and the like. Further, the beam management can be used with multiple TRPs, including the TRP 1 for the gNB 402 and one or more other TRPs 403. The other TRPs are associated with other nodes, such as other gNBs.

The UE 401 and/or the gNB 402 can coordinate beam management with the other TRPs 403. The coordination (coordination information) can include synchronizing reference signals, measurement of reference signals, antenna panels, and the like. Further, the reference signals from the TRPs 403 and the TRP 1 402 can be synchronized. In one example, the reference signals are time synchronized. In another example, the reference signals are time multiplexed.

As a result of the coordination (coordination information), beamforming can be performed with the UE 401 and the TRP 1 and the other TRPs at about the same time and/or simultaneously by coordinating and/or synchronizing the generation of reference signals and the like, as described above.

In one example, the gNB 402 coordinates the beam management with the other TRPs 403 by generating a request 412 for beam management. The request 412 is provided to the UE device 401. Another request (a second request) 414 can be sent to the other TRPs 403. In one example, the second request 414 is passed by the UE device 401 to the other TRPs using active links. In another example, the second request is sent from the TRP1 to the other TRPs 403. The second request can be identical and/or include the same coordination information as the request 412.

The request 412 (and the second request 414) can include a trigger and/or synchronization for the generation and/or transmission of reference signals by or associated with the TRP 1 and the other TRPs 403. The trigger can include a specified time, a periodic time and the like. Beam forming is then performed using the coordinated reference signals. Additional details on the coordination are provided below.

In another example of beam coordination, triggers and/or information is provided to the TRP1 and to the other TRPs 403 that facilitate beam sweeping of beams at the UE 401. The beam sweeping at the UE 401 can include sweeping beams across a plurality of antenna panels and the like. The swept beams can be measured for beam formation, beam indication and the like. Further, the measured information along with associated information, such as antenna panel and/or TxRU, can also be provided as a beam state report.

FIG. 5 illustrates an architecture of a system 500 in accordance with some embodiments. The system 500 is provided as an example of a suitable transmit/receive antenna panel architecture. The system 500 is provided for illustrative purposes and it is appreciated that components/elements can be included and/or omitted. Further, the system 500 can be utilized with and understood in view of the system 400 and/or the system 100, described above.

In the 5G NR system, beam forming is used at both the Transmission Reception Point (TRP) side and the UE side (such as UE 401). The TRP, also designated as TRPx, is a point or antenna array available to one or more entities of the network, such as gNB, base stations, nodes, and the like. For example, In 5G, gNBs can include an antenna array (i.e., one or more antenna elements called TRPs) available to the network located at a specific geographical location. In the 5G context, a NR cell is established by one or more TRP(s).

Beam management can be used to acquire and maintain TRP and UE beams for communication. The beam management can be used for downlink and uplink communications and includes Tx and/or Rx beams. For downlink, the beam management procedures can include: P-1, P-2 and P-3. P-1 is used to obtain the initial TRP Tx beam and UE Rx beam.

P-2 is used to enable TRP Tx beam refinement. P-3 is used to enable the UE Rx beam refinement.

Generally, a TRP, such as the TRP 1 associated with the gNB 402, transmits or broadcasts reference signals, such as CSI-RS. In one example, for P-1, the TRP periodically broadcasts reference signals. The UE measures the reference signals.

After measurement, the UE can determine and/or report which Rx and/or Tx beams are suitable for communications to the TRP in the form of a beam state report, also referred to as reporting content. The beam state report generally includes information related to or associated with the measured reference signals. The UE sends the reporting content or beam state report that includes beam related information, such as, a Tx beam index, beam pair link (BPL) index and/or a reference signal received power (RSRP).

To mitigate overhead used for the beam state report, group based beam reporting can be used. A first option/approach is to use a receive (Rx) beam set/group based reporting (Alt 1) in which different Tx beams reported for the same set can be simultaneously received by the UE. A second solution/approach is Rx antenna group/antenna panel based reporting (Alt 2), where different Tx beams reported from different panels can be simultaneously received by the UE. It is appreciated that other approaches/options are contemplated.

It is appreciated that UE devices can utilize multiple antenna panels may and such device may switch among different antenna panels to perform measurements on beams. Thus, the UE device can obtain antenna panel based measurements of the reference signals. Further, the number of transceiver units (TxRUs) may be less than the number of antenna panels. In this case, a process ID can be introduced for group based reporting. Groups sharing the same process ID indicates those groups of beams that can be active simultaneously at the UE side. Thus the network side (e.g., a TRP/gNB) could know which beams can be received at the same time by the UE. As a result, a gNB can select transmission or transmit (Tx) beams to be utilized simultaneously (for higher rank transmission(s)).

The system 500 is for a UE device, such as the UE 401 of FIG. 4. The system 500 includes a modem 502, a first transmit receive unit (TxRU 0) 504, a second transmit receive unit (TxRU 1) 506, a first switch circuit 508, a second switch circuit 510, a first antenna panel 512, a second antenna panel 514, a third antenna panel 516 and a fourth antenna panel 518. It is appreciated that some embodiments can utilize architectures with differing numbers of TxRUs, antenna panels and the like.

The UE device can switch, sweep, rotate and the like to beams among different UE antenna panels for reception when the number of TxRUs is less than the number of UE antenna panels. The beams can include Tx and/or Rx beams.

The system 500 in this example includes two TxRUs and four antenna panels. The switches 508 and 510 are used to switch or selectively connect the antenna panels to the TxRUs. Circuitry, such as the baseband circuitry 204 and the RF circuitry 206 can be utilized to control or operate the switches 508 and 510.

The first TxRU 504 and the second TxRU 506 connect to panels 0 (512) and 2 (516) or panels 1 (514) and 3 (518). As configured in this example, panels 0 and 2 or panels 1 and 3 can be active at the same time. Information regarding which panels can be active simultaneously active can be predetermined, provided via signaling, provided by messaging and/or the like.

The TxRUs can be part of or associated with baseband circuitry of the UE device, such as the baseband circuitry 204.

The antenna panels (512, 516, 514 and 518) can be incorporated with the antenna(s) 210, shown above.

The UE device measures reference signals, such as the CSI-RS, for various combinations of the TxRUs and antenna panels (0-1) and generates a beam state report that includes measurements for the various combinations. Thus, the beam state report can include measurements of the reference signals based on TxRU and/or antenna panel. Additionally, the information in the beam state report can be grouped as described above and below to mitigate overhead and reduce complexity. The UE provides or transmits the beam state report to a gNB for beam selection.

In one example, the gNB ranks the various combinations of beams and selects higher ranked beams for higher ranked data transmissions.

In another example, the selects Tx and/or Rx beams for communication based on the beam state report.

In another example, the gNB regroups the beams and selects Tx and/or Rx beams for communication based on the beam state report.

The gNB can also perform beam indication to inform the UE device which Tx and/or Rx beams to use. The beam indication/notification can be provided by messaging, provided by signaling (such as higher layer signaling), provided using control channels (such as PDCCH), provided by downlink control information (DCI), and the like.

Figure 6:
FIG. 6 is a diagram illustrating a beam state report that include a process identification (ID) in accordance with some embodiments.

FIG. 6 is a diagram illustrating a beam state report 600 that include a process identification (ID) in accordance with some embodiments. The report 600 is provided for illustrative purposes and it is appreciated that suitable variations are contemplated. Additionally, the report 600 can be utilized with the system 400 and/or the system 100, described above.

Generally, a beam state report includes various suitable fields to convey information about Tx and/or Rx beams for beam formation for uplink or downlink communications between a TRP and a UE device. In this example, the beam state report 600 includes a process ID to facilitate ranking and beam selection. Generally, panels/groups having the same process ID indicate that those panels/groups of beams can be active at the same time.

The report 600 shows an example of a suitable reporting format that includes this process ID. The report 600 shows example fields/information that can be included in a beam state report. The report 600 is generally described for downlink communication, however The report 600 includes a beam pair link (BPL) index or a transmit (TX) beam index, a group ID, a process ID and an RSRP. The BPL index/Tx beam index identify the beams/beam pairs, the group ID identifies a group for the beams, the process ID identifies which beams can be active simultaneously. The RSRP is typically measured by a UE device.

The BPL index identifies a pair of beams that include a transmit (Tx) beam and a receive (Rx) beam. The Tx beam is at a TRP, gNB and the like whereas the Rx beam is at a UE device, for downlink transmissions/communications. Thus, the BPL index identifies a pair of Tx and Rx beams from a group or existing active beam pairs. The beam pairs can also be referred to as links or active links between the TRP and the UE device.

For illustrative purposes, the report 600 is described with reference to the system 500 of FIG. 5. The antenna panels 0 and 2 (512 and 516) are configured with a process ID of Process 0, and antenna panels 1 and 3 (514 and 518) are configured with a process ID of Process 1.

With the process ID, the gNB or TRP can select beams or Tx beams to antenna panels that can be active simultaneously by using the process ID.

As stated above, the process ID (field) is used to indicate whether groups/sets of beams can be active simultaneously or not. The groups/panels with the same process ID could be active at the same time at the UE side. The field of the process ID can be omitted, for example, if all the UE antenna panels could be active simultaneously, i.e. only one process is needed.

In another example, the process ID indicates beams observed by the UE device that can be simultaneously active, where beams having different values for the process identification cannot be simultaneously active and beams with the same process identification can be simultaneously active The group ID field also indicates the UE antenna panels and/or UE antenna port groups that belong to/within a group and can indicate groups/sets of beams that can be active simultaneously.

In another embodiment or example, the beam state report and/or number of beam reporting processes can be reported by higher layer signaling and the like, such as UE capability reporting. Then when reporting the beam state, the gNB could indicate a sub-set of processes by Downlink Control Information (DCI), higher layer signaling and the like. The UE should only report the beams based on the configured sub-set of processes.

Generation of a beam state report, such as the report 600, can also be used for uplink transmissions/communications. If the amount or number of UE TxRUs is less than the number of UE antenna panels, then the UE can provide the TRP (at a gNB) with that information. When the UE sends multiple Tx beams simultaneously in uplink, the UE Tx beams is/are determined through an uplink beam management procedure. Then, the TRP feeds back which UE Tx beams are selected for transmission. Thus, the TRP can have information on which UE Tx beams can be sent simultaneously, i.e. which UE antenna panels could be active at the same time in order to perform higher rank transmission in the uplink.

The process ID can be utilized in a beam state report for uplink similar to its use in the beam state report for downlink. For the uplink beam state report, the UE informs the TRP that antenna panels with the same process ID can be active at the same time or simultaneously.

In another embodiment or example, for uplink processing, if the UE's antenna panels cannot be active at the same, the UE provides that information to the TRP when performing UE side beam sweeping for uplink beam management. A process ID is introduced or included in the uplink beam state report. Those antenna panels which can be active simultaneously should be configured with the same process ID.

In yet another embodiment or example, matrix based beam reporting and beam indication can be used. The UE device reports Tx beams based on UE antenna panels and each group includes Tx beams observed per panel. A matrix of Tx beams is constructed for the groups and panels and the matrix, also referred to as a beam state report matrix, is provided by the UE to the gNB.

Figure 7:
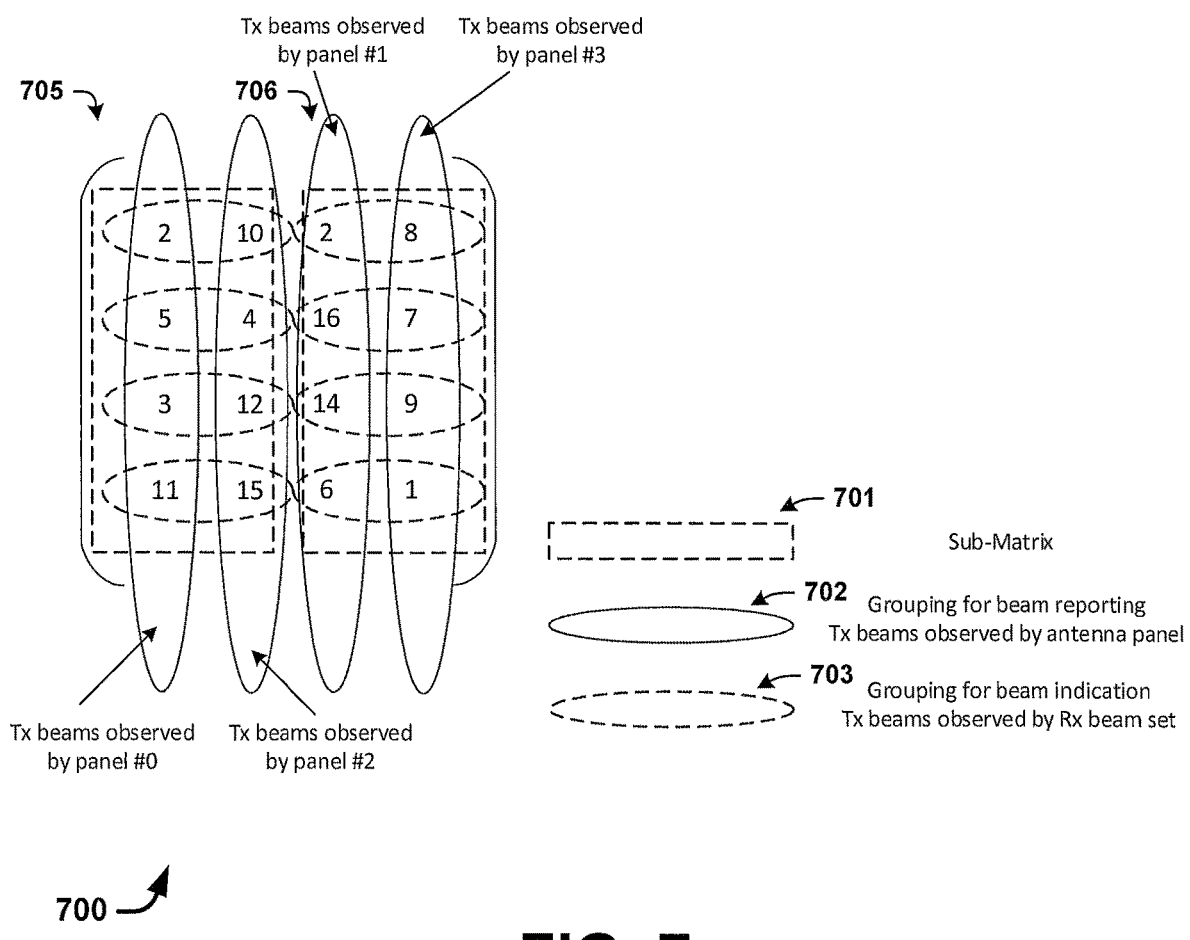
FIG. 7 is a diagram illustrating a beam state report/matrix in accordance with some embodiments.

FIG. 7 is a diagram illustrating a beam state report/matrix 700 in accordance with some embodiments. The report 700 is provided for illustrative purposes and it is appreciated that suitable variations are contemplated. Additionally, the report 700 can be utilized with the system 400 and/or the system 100, described above.

The report 700 is also described in conjunction with the antenna panel architecture of the system 500 shown in FIG. 5, for illustrative purposes. However, it is appreciated that matrix reports can include/utilize various alternatives and configurations of the system 500, such as more and/or less antenna panels and TxRUs.

The report 700 includes various Tx beams as observed by antenna panels 0, 1, 2 and 3 (See FIG. 5), of a UE device. The matrix report 700 includes groupings based on sub matrix 701, grouping for beam reporting by antenna panel 702 and grouping for beam indication by Rx beam set/group 703.

The antenna panel groupings 702 are shown as indicated and include columns of the matrix report 700. Thus, in this example, there are four panel groups 702, one panel group per panel. Further, there are four measured beams per panel group. For example, the panel group 0 includes Tx beams having measured values of {2, 5, 3, and 11}.

The UE device provides the report 700 that includes the sub matrix grouping 701 and the panel groups 702. The gNB performs beam selection/indication based on the provided report 700. The gNB can reconstruct the matrix report 700 based on a selection and/or criteria. In one example, the gNB performs beam selection/indication by picking one Tx beam from each panel and using a group index for indication of that group. It is appreciated that other beam selection/indication can be performed.

In another example, the UE can reconstruct the matrix report 700 based on a selection and/or criteria.

For the gNB and/or UE reconstructing the groups, the same criteria/rules can be applied. In another example, different criteria/rules can be applied so that different criteria is used for beam reporting (on the UE side) and beam indication (at the gNB). For example, the grouping for beam reporting can be based on UE antenna panels (Alt 2) and grouping for beam indication can be based on the UE Rx beam set (Alt 1).

The matrix report 700 is divided into a first sub-matrix 705 and a second sub-matrix 706. The first sub-matrix 705 includes antenna panel 0 and panel 2. The second sub-matrix 706 includes antenna panel 1 and panel 3. Here, the sub-matrix assignment indicates that the groups/panels within the particular sub-matrix can be active simultaneously. The UE informs the gNB how many sub-matrix are present. In this example, the UE can report to gNB that two sub-matrixes are included and the overhead for this information is 1 bit. The overhead associated with using the sub-matrixes can be less than attaching a process ID to each Tx beam and/or each group.

In an example, the UE reports the number of sub-matrixes included in the report 700 if the number/amount UE TxRU is less than the number of UE antenna panels. As stated above, the groups/panels within the same sub-matrix can be active simultaneously.

In another example, the number of groups is equal to the number of groups that can be active simultaneously if the number of UE TxRU is larger than the number of UE antenna panels. For example, if the UE has two antenna panels and each panel can utilize dual polarization, then the number of groups for beam reporting should be four. In another example, if the number of UE TxRU is 6 and the number of antenna panels is 4, the number of groups for beam reporting is 4.

Figure 8:
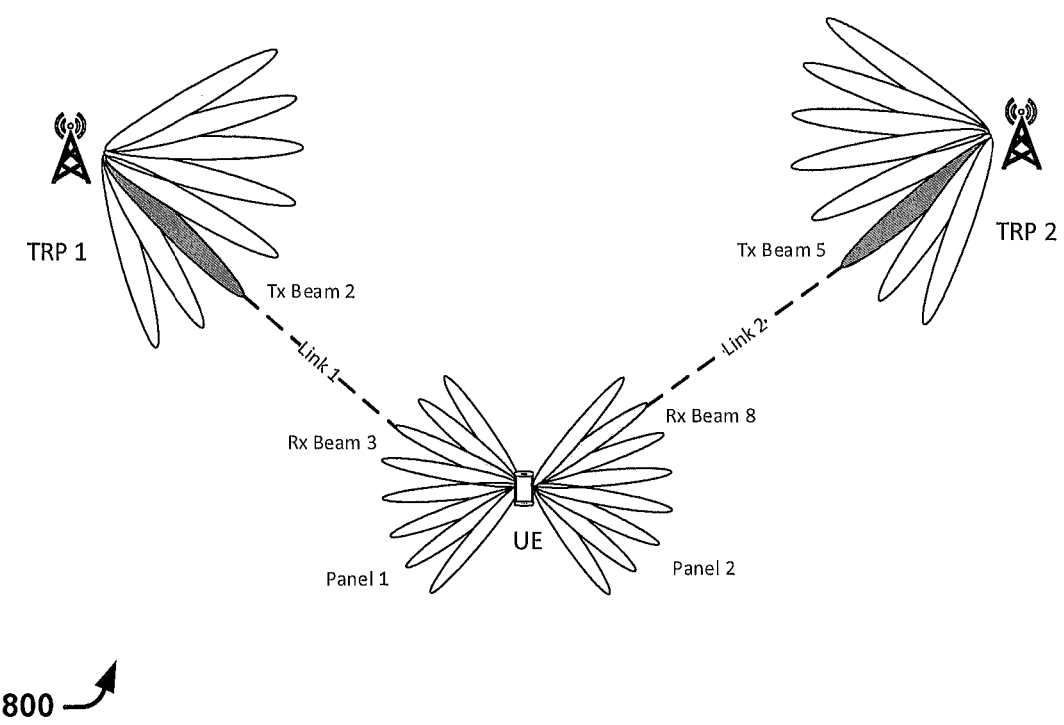
FIG. 8 is a diagram illustrating a system using multiple TRPs and multiple antenna panels in accordance with some embodiments.

FIG. 8 is a diagram illustrating a system 800 using multiple TRPs and multiple antenna panels in accordance with some embodiments. The system 800 is provided for illustrative purposes and it is appreciated that suitable variations are contemplated. Additionally, the system 800 can be utilized with the system 400, 500 and/or the system 100, described above.

The system 800 includes a UE device 801, a first TRP (1) 802 and a second TRP (2) 803. The TRPs 802 and 803 can be from or associated with nodes, such as gNBs.

The UE device 801 is shown have a first antenna panel, Panel 1, and a second antenna panel, Panel 2. An example of multiple panels for a UE device is shown in FIG. 5. Additionally, the UE device 401 can also be used as the UE device 801. Additionally, the gNB and TRP 402 and the other TRPs 403 can be used as the first TRP 802 and the second TRP 803.

The UE device 801 maintains a communication link 1 with TRP1 802 via a beam pair: Tx beam 2, Rx Beam 3 of Panel 1, and a communication link 2 with TRP2 803 is via a beam pair: Tx beam 5, Rx beam 8 of Panel 2. By using different panels, the UE device 801 can send/receive different data stream with different TRPs for better performance.

It is appreciated that beam management procedures in the scenario of multi-TRP and multi-panel operation can be complex. For example, when movement/blockage/rotation happens, the UE device may refine the UE side beam, including Rx and Tx beam. In some cases or examples, the UE side beams across different panels are swept for refinement. For example, if the UE device 801 rotates with 180 degrees, the panels linked with different TRPs should be alternated. If the quality of Link 1 FIG. 8 drops, then a P-3/U-3 procedure can be triggered to refine the UE Rx/Tx beam to maintain the link with TRP1. In this case, there can be some impact on Link 2 with TRP 2 because the data communication with TRP 2 should be interrupted since some beams on Panel 2 should be swept.

Beam coordination with the TRP 1, the UE and the TRP 2 can be performed to mitigate interruptions and/or impact to active links, such as Link 1 and Link 2.

FIG. 9 is a table 900 illustrating received power for a communication system in accordance with some embodiments. The table 900 is provided for illustrative purposes and it is appreciated that suitable variations are contemplated. Additionally, the table 900 can be utilized with the system 400, the system 800 and/or the system 100, described above.

The description of table 900 references TRP 1 (first TRP 1 802 of FIG. 8) and TRP 2 (second TRP 2 803 of FIG. 8) for illustrative purposes. However, it is appreciated that the table 900 and variations thereof can be utilized with other communication systems. A UE device, such as the UE device 801 of FIG. 8, includes a first antenna panel (panel 1) and a second antenna panel (panel 2) in this example.

The table 900 depicts measured or determined reference signal received power (RSRP) for various Tx beams and Rx beams and panels. The RSRP is in decibel-miliwatts (dBm). A second column from the left indicates Rx beams for panel 1 and panel 2 as shown. A row indicates various Tx beams for TRP 1 and TRP 2.

The UE device's panel 1 is used to communicate with TRP1 and the UE device's panel 2 is used to communicate with TRP2. The UE device rotates beams/panels and, after the rotation, the RSRP for different beams is obtained and shown in table 1000, shown below.

FIG. 10 is a table 1000 illustrating received power for a communication system after rotation in accordance with some embodiments. The table 1000 is provided for illustrative purposes and it is appreciated that suitable variations are contemplated. Additionally, the table 1000 can be utilized with the system 400, the system 800 and/or the system 100, described above.

The table 1000 is substantially similar to the table 900. However, the UE device's panel 1 is now used to communicate with the TRP 2 and the UE device's panel 2 is used to communicate with the TRP 1.

If the UE beam refinement for different TRPs is performed separately, during/after the refinement, another link may be interrupted. If the UE beam refinement is performed jointly, some coordination between TRPs can mitigate interruptions of links.

In another scenario/example of multi-TRP and single-panel operation, the UE device has only one panel and communicates with multiple TRPs. The transmission point can change dynamically, i.e. it works with dynamic point selection (DPS). In this case/example, when the UE needs to perform beam management with one TRP, the data connection with other TRPs is interrupted.

A first approach to coordinate beam management among a multiple or plurality of TRPs is referred to as Solution A. This approach can be used with, for example, the system 800 and the like. This approach uses UE side beam sweeping that is triggered at the same time among all the TRPs which have active communication links with the UE device. For example, if P-3 is triggered with one TRP, then other TRPs with communication links with the UE device are also informed to perform P-3 procedure. The linked TRPs send the P-3 signal simultaneously, i.e. CSI-RS for one TRP beam with certain repetitions. Alternatively the CSI-RSs from different TRPs could be time multiplexed.

For P-1, it is based on CSI-RS and performed periodically. With multi-TRP and multi-panel operation, the periodicity can be the same among the linked TRPs, i.e. the P-1 CSI-RS transmission is synchronized among the linked TRPs. Coordination among TRPs to align the CSI-RS transmission for P-1.

In an embodiment or example, for multi-TRP and multi-panel/single-panel operation, the CSI-RS periodicity for P-1 is the same for linked TRPs and the transmission(s) are aligned. Thus, the P-1 procedure is performed simultaneously among the linked TRPs. In another example for P-1, the CSI-RSs for P-1 from different TRPs are time multiplexed.

For P-2, which is used to refine the TRP Tx beam, the UE Rx beam is fixed. Thus, P-2 can be performed independently among the TRPs for multi-TRP and multi-panel operation.

For P-3, the coordination is used to refine the UE Rx beam and is performed aperiodically. The TRP sends a CSI-RS for one TRP Tx beam with repetitions. For multi-TRP and multi-panel operation, the P-3 CSI-RS is sent at the same time among the linked TRPs. Signaling exchange can be used to coordinate the timing for the P-e CSI-RS. If the P-3 is requested by one TRP, the TRP inform other TRPs to also perform P-3 and align the P-3 signal transmission.

If the P-3 is triggered by the UE device, then the UE send a request to linked TRPs to enable the synchronized P-3 procedure among all the TRPs. After beam refinement, if the UE changes to a new panel, it should feedback the information to the TRP side.

Figure 11:
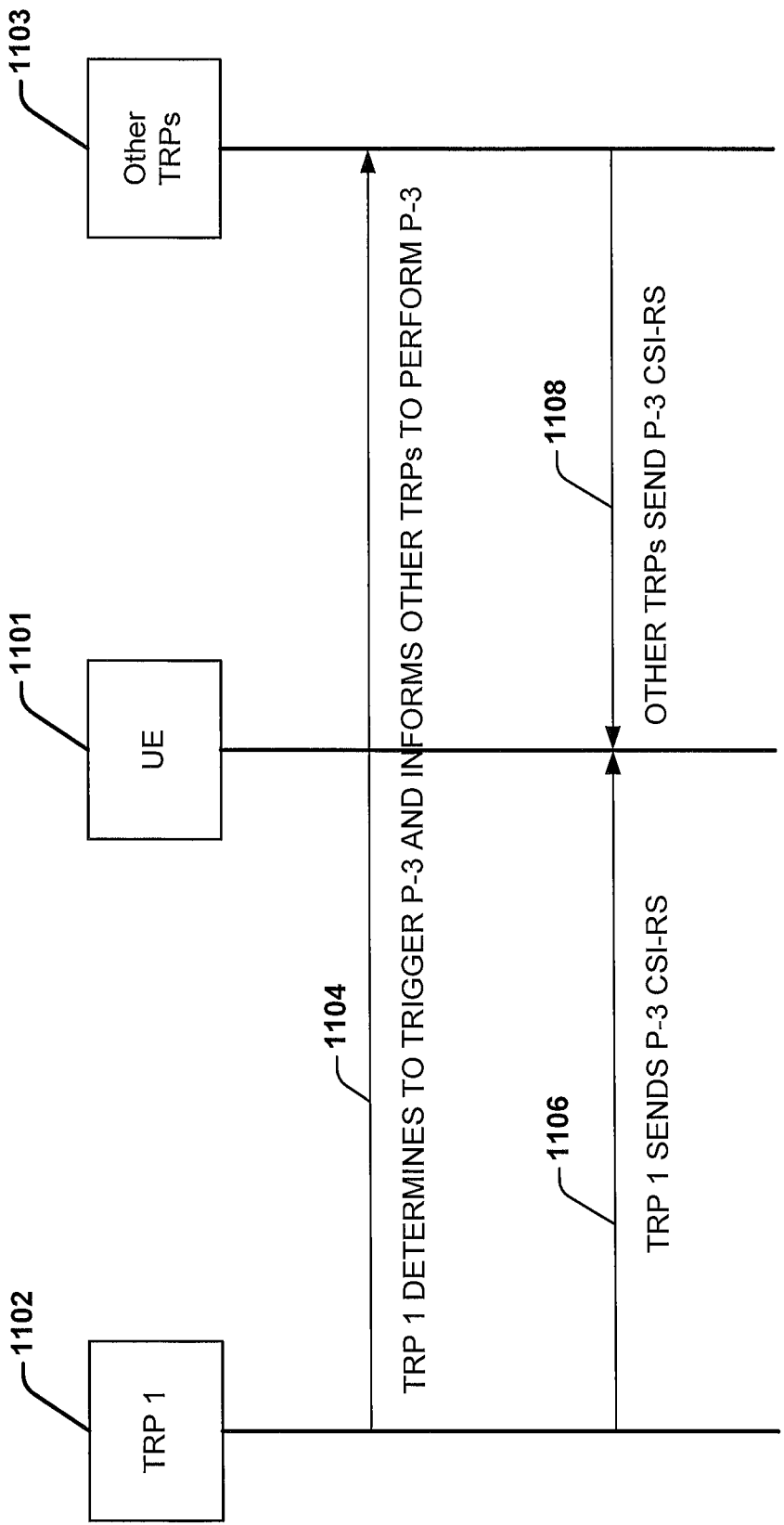
FIG. 11 is a diagram illustrating a system for communications using multiple TRPs in accordance with some embodiments.

FIG. 11 is a diagram illustrating a system 1100 for communications using multiple TRPs in accordance with some embodiments. The system 1100 is provided for illustrative purposes and it is appreciated that suitable variations are contemplated. Additionally, the system 1100 can be utilized with the system 400, the system 800 and/or the system 100, described above.

The system 1100 performed multiple TRP and multiple antenna panel coordinated beam management. In this example, the coordinated beam management is for P-3.

The system 1100 includes a UE device 1101, a first TRP 1102 (TRP 1) and one or more other TRPs 1103 (Other TRPs). The TRP 1 and the Other TRPs are linked with the UE device 110.

In this example, the TRP 1 requests UE Rx beam refinement as P-3. The TRP 1 informs the Other TRPs to also perform UE Rx beam refinement (P-3) at 1104 via transmission, signaling and the like. The TRP 1 can also send along the time or synchronization for the UE Rx beam refinement.

The TRP 1 and the OTHER TRPs generate and send CSI-RS at the designated time or simultaneously. The TRP 1 sends a P-3 CSI-RS as shown at 1106. The Other TRPs send a P-3 CSI-RS as shown at 1108. It is appreciated that there can be more than one CSI-RS and/or CSI-RS from multiple TRPs at 1108.

As a result, the UE device 1101 receives the CSI-RS from 1106 and from 1108 simultaneously, which mitigate interruption of links from the UE to the TRP 1 and/or the Other TRPs.

In one example, for a P-3 procedure with multi-TRP and multi-panel/single-panel operation, if P-3 is requested by one TRP, the TRP should inform other TRPs to interrupt data transmission to perform P-3 and align the P-3 signal transmission. If P-3 is triggered by the UE, the UE should send the request to all the TRPs to enable the synchronized P-3 among all the TRPs. The CSI-RSs for P-3 from different TRPs could be sent at the same time or time multiplexed.

Similarly, for uplink U-1, with multi-TRP and multi-panel operation, if the UE needs to perform U-1 procedure, all the TRPs should perform the beam sweeping operation.

For U-2, since the UE Tx beam is fixed, it could be performed independently among all the TRPs.

For U-3, once the UE needs to do UE Tx beam sweeping, all the TRPs should perform the U-3 procedure. If U-3 is requested by one TRP, the TRP should inform other TRPs to also perform U-3 procedure. If the U-3 is requested by the UE, then the UE should send the request to all the TRPs.

In one example, if U-3 is requested by one TRP, the TRP should inform other TRPs to interrupt data reception and perform U-3 procedure. If the U-3 is requested by the UE, then the UE should send the request to all the TRPs.

Alternatively, for multi-TRP and multi-panel operation, whether the beam management procedures should be performed simultaneously among all the TRPs could be determined by the UE. If the UE is to sweep the UE Rx/Tx beam(s) across different UE antenna panels, then the beam management procedure should be performed at the same time among all the TRPs. Otherwise the beam management could be performed independently by different TRPs. Since P-1/U-1 sweep the entire UE side beams, P-1/U-1 is done simultaneously by all the linked TRPs. For P-3/U-3, the UE indicates whether the UE side beam sweeping is done across different UE antenna panels. If the UE beam sweeping is within one panel, then the P-3/U-3 can be done independently, otherwise the P-3/U-3 should be done simultaneously by all the TRPs.

Figure 12:
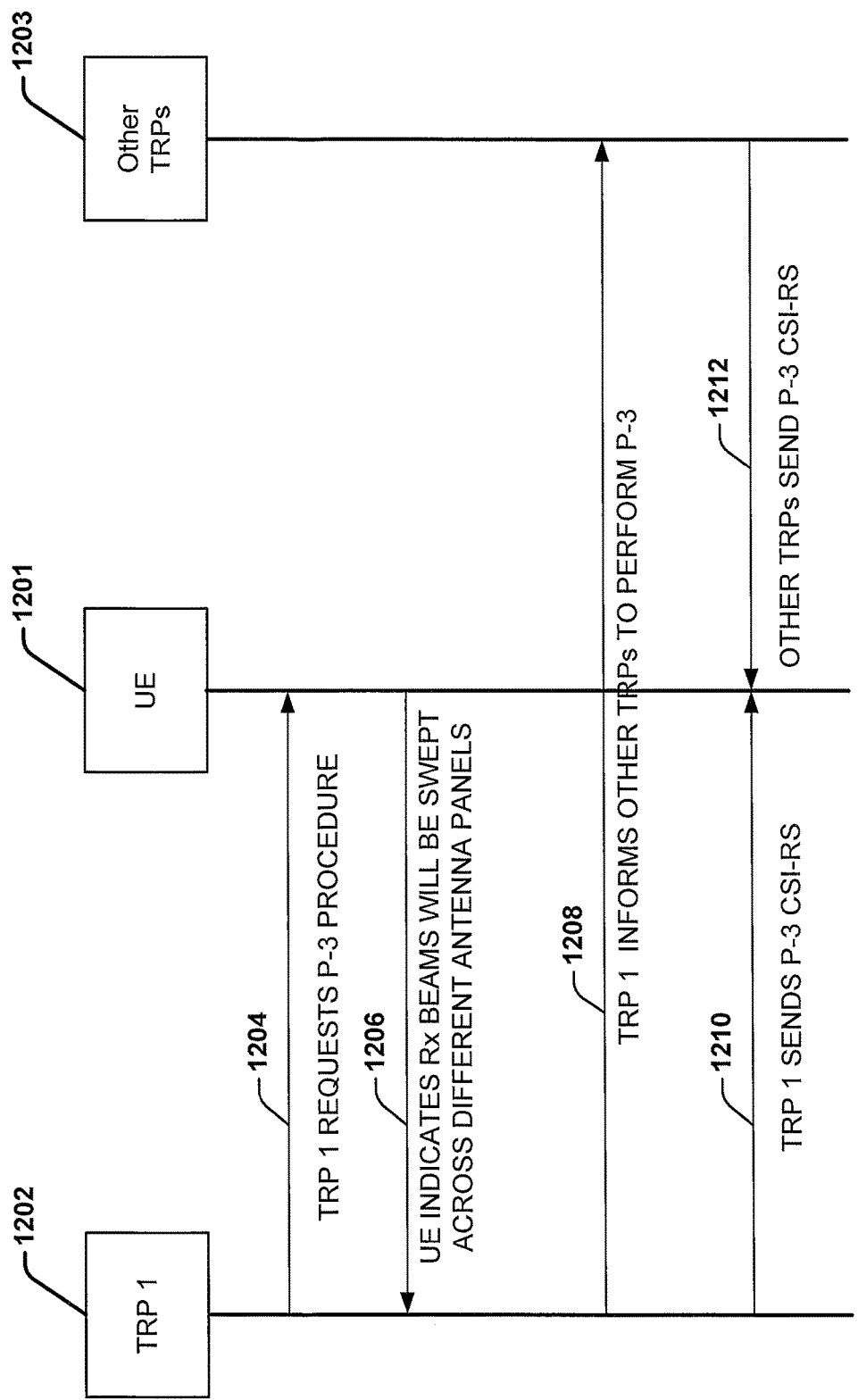
FIG. 12 is a diagram illustrating a system for communications using multiple TRPs in accordance with some embodiments.

FIG. 12 is a diagram illustrating a system 1200 for communications using multiple TRPs in accordance with some embodiments. The system 1200 is provided for illustrative purposes and it is appreciated that suitable variations are contemplated. Additionally, the system 1200 can be utilized with the system 400, the system 800 and/or the system 100, described above.

The system 1200 performed multiple TRP and multiple antenna panel coordinated beam management. In this example, the coordinated beam management is for P-3.

The system 1200 includes a UE device 1201, a first TRP 1202 (TRP 1) and one or more other TRPs 1203 (Other TRPs). The TRP 1 and the Other TRPs are linked with the UE device 1201.

In this example, the TRP 1 requests UE Rx beam refinement (P-3) at 1204. Here, the UE 1201 indicates that Rx beams will be swept across different antenna panels to the TRP 1 as shown at 1206.

The TRP 1 informs the Other TRPs to also perform UE Rx beam refinement (P-3) at 1208 via transmission, signaling and the like. The TRP 1 can also send along the time or synchronization for the UE Rx beam refinement.

The TRP 1 and the OTHER TRPs generate and send CSI-RS at the designated time or simultaneously. The TRP 1 sends a P-3 CSI-RS as shown at 1210. The Other TRPs send a P-3 CSI-RS as shown at 1212. It is appreciated that there can be more than one CSI-RS and/or CSI-RS from multiple TRPs at 1212.

As a result, the UE device 1201 receives the CSI-RS from 1210 and from 1212 simultaneously, which mitigate interruption of links from the UE to the TRP 1 and/or the Other TRPs.

In one example, for multi-TRP and multi-panel operation, when P-1/U-1 is triggered, the P-1/U-1 procedure should be performed at the same time among all the TRPs. When P-3/U-3 is triggered by one TRP, the UE should indicate to the TRP whether the UE side Rx/Tx beam sweeping will be performed across different UE antenna panels. If the UE side beam sweeping is within one antenna panel, the P-3/U-3 procedure could be performed independently. If the UE side beam sweeping is across different panel, the TRP should inform other TRPs so that the P-3/U-3 will be performed jointly by all the TRPs. The CSI-RSs from different TRPs for beam management could be sent simultaneously or time multiplexed. Alternatively, it could be the UE that sends P-3/U-3 request to other TRPs so that the P-3/U-3 is performed simultaneously by all the TRPs. If the P-3/U-3 is triggered by the UE with one TRP, the UE determines whether the UE side Rx/Tx beam sweeping will be performed across different UE antenna panels. If the UE side beam sweeping is on the same panel, the UE performs P-3/U-3 with one TRP. If the UE side beam sweeping is on different panels, the UE sends the P-3/U-3 request to all the TRPs. For multi-TRP and single-panel operation, it could be viewed as a special case that the UE side beams are swept across different panels.

In another example, for multi-TRP and multi-panel/single-panel operation, the TRPs which have communication links with the UE could be viewed as a virtual cell. When performing beam management, the configuration of CSI-RSs is performed at the virtual cell level and the configuration should be known to all the TRPs within the virtual cell. Thus, the beam management procedures are performed jointly among the TRPs. The CSI-RSs from different TRPs can be time multiplexed or delivered simultaneously. The data transmission should be interrupted when performing beam management procedure. Additionally, the UE side behavior could be transparent to the network side.

Another approach to coordination of beam management is referred to as solution B. Here, a measurement gap is introduced to reduce the impact on data transmission. When a beam management procedure with one TRP is performed across different UE antenna panels, a measurement gap is configured.

For example, if the TRP 1 requests P-3 procedure and the UE sweeps Rx beams on both panel 1 and panel 2, then some measurement gap can configured for the UE. When the UE measures the TRP1 Tx beams using Rx beam from panel 2, it uses the configured measurement gap to do the measurement and interrupt the data transmission with TRP2 temporarily.

The measurement gap configuration is known to TRP 2 so that TRP 2 can prepare for data interruption. The measurement gap configuration could be configured by higher layer signaling. Or the measurement gap is configured together with the beam management procedure request/trigger signaling. The measurement gap is mainly used for downlink procedure. For uplink, the UE performs beam sweeping across different panels with one TRP, i.e. the UL beam refinement is performed independently among TRPs, and other TRPs should be aware of the data interruption.

With the measurement gap, the beam management procedure can be performed independently among all the TRPs.

For P-1, if measurement gap is configured, since the UE needs to sweep all the Rx beams, more overhead and data interruption may be observed.

For P-2, there is no need for measurement gap since the UE Rx beam is fixed.

For P-3, the gap could be configured for the UE to sweep Rx beams across different panels.

In one example, for multi-TRP and multi-panel/single-panel operation, the UE could be configured with measurement gap to sweep Rx beams across different antenna panels. When UE performs beam management procedure with one TRP, it could use the gap to sweep the Rx beams on the panel associated with other TRPs and the data transmission with other TRPs will be interrupted. The gap could be configured via higher layer signaling or together with the beam management procedure request/trigger signaling. And the gap configuration should be known to other TRPs.

Alternatively, the UE could determine whether measurement gap is needed for beam management procedure. If the UE needs to sweep the UE Rx beam across different UE antenna panels, then measurement gap should be configured. If the UE need to sweep the UE Rx beams on the same panel, then the measurement gap is not necessary. The UE should indicate to the TRP whether Rx beams across different UE antenna panels should be swept for beam management.

Further, after beam refinement, if the new UE beam comes from another panel which is used for another link, that link may be interrupted until the UE finds out a good Tx-Rx beam pair link to communicate with the TRP in another link. That link should be interrupted until the UE reports the L1-RSRP for corresponding TRP. Therefore the UE should report a L1-RSRP with a group index after P-3, where a group index can be used to indicate whether a new panel is used.

Generally, if beam management and/or beam management procedures are performed across a plurality of antenna panels, then the gap period should be configured. Alternatively, if the beam management procedures should be performed on a single antenna panel, then the gap period can be omitted.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in a memory, nonvolatile memory (see below), disk storage (see below), and memory storage (see below). Further, nonvolatile memory can be included in read only memory, programmable read only memory, electrically programmable read only memory, electrically erasable programmable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to include, without being limited to including, these and any other suitable types of memory.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is an apparatus configured to be employed within a base station, such as a next Generation NodeB (gNB). The apparatus comprises baseband circuitry which includes a radio frequency (RF) interface and one or more processors. The one or more processors are configured to generate one or more signals for transmission to a user equipment (UE) device, wherein the UE device has a plurality of antenna panels; receive a beam state report from the RF interface from the UE device; select beams for communication with one or more of the plurality of antenna panels based on the received beam state report.

Example 2 includes the subject matter of Example 1, including or omitting optional elements, wherein the one or more processors are configured to generate a beam indication or perform beam indication based on the received beam state report and to provide the beam indication to the UE using the RF interface and/or higher layer signaling.

Example 3 includes the subject matter of any of Examples 1-2, including or omitting optional elements, wherein the beam state report includes a transmission beam index, a process identification associated with the transmission beam index and a received signal strength associated with the transmission beam index for a plurality of beams.

Example 4 includes the subject matter of any of Examples 1-3, including or omitting optional elements, wherein the process identification indicates beams observed by the UE device that can be simultaneously active, where beams having different values for the process identification cannot be simultaneously active and beams with the same process identification can be simultaneously active.

Example 5 includes the subject matter of any of Examples 1-4, including or omitting optional elements, wherein the beam state report includes a transmission beam index, a group identification associated with the transmission beam index, a process identification associated with the transmission beam index and a received signal strength associated with the transmission beam index, wherein the group identification indicates beams that can be received simultaneously by the UE and the group indication is based on the plurality of antenna panels.

Example 6 includes the subject matter of any of Examples 1-5, including or omitting optional elements, wherein the process identification indicates beams with different process identification are observed by the UE with different antenna panels which can't be simultaneously active. And beams with the same process identification are observed by the UE with the same or different antenna panels which can be simultaneously active.

Example 7 includes the subject matter of any of Examples 1-6, including or omitting optional elements, wherein the beam state report is a matrix having a first grouping for beam reporting and a second grouping for beam indication.

Example 8 includes the subject matter of any of Examples 1-7, including or omitting optional elements, wherein the one or more processors are configured to regroup the matrix.

Example 9 is an apparatus configured to be employed within a user equipment (UE) device comprising baseband circuitry, a plurality of antenna panels associated with an RF interface and one or more transceiver units (TxRUs). The baseband circuitry includes a radio frequency (RF) interface and one or more processors. The RF interface is configured to receive one or more reference signals from a base station. The one or more processors are configured measure the one or more reference signals to obtain one or more beam measurements; group the one or more beam measurements based on the plurality of antenna panels and the one or more TxRUs; and generate a beam state report based on the grouped one or more measurements.

Example 10 includes the subject matter of Example 9, including or omitting optional elements, wherein the number of the one or more TxRUs is less than or equal to the number of the plurality of antenna panels.

Example 11 includes the subject matter of any of Examples 9-10, including or omitting optional elements, wherein the grouped one or more measurements indicate beams received at a subset of the plurality of antenna panels that can receive transmissions simultaneously.

Example 12 includes the subject matter of any of Examples 9-11, including or omitting optional elements, wherein the beam state report is generated in the form of a matrix.

Example 13 includes the subject matter of any of Examples 9-12, including or omitting optional elements, wherein the beam state report includes a transmission beam index, a group identification associated with the transmission beam index and a received signal strength associated with the transmission beam index.

Example 14 is an apparatus configured to be employed within a base station, such as a next Generation NodeB (gNB). The apparatus comprises comprising baseband circuitry and a transmission reception point (TRP). The baseband circuitry having a radio frequency (RF) interface and one or more processors. The one or more processors are configured to generate a request for a beam management procedure with one or more other TRPs and a user equipment (UE) device; provide the request to the one or more other TRPs via the RF interface; and perform the beam management procedure according to the provided request.

Example 15 includes the subject matter of Example 14, including or omitting optional elements, wherein the beam management procedure comprises one of initial beam acquisition, transmit (Tx) beam refinement, or receive (Rx) beam refinement.

Example 16 includes the subject matter of any of Examples 14-15, including or omitting optional elements, wherein the beam management procedure is performed for downlink communications with the UE device or uplink communications with the UE device.

Example 17 includes the subject matter of any of Examples 14-16, including or omitting optional elements, wherein the one or more processors are further configured to generate a reference signal and transmit the reference signal via the RF interface to the UE device according to the request.

Example 18 includes the subject matter of any of Examples 14-17, including or omitting optional elements, wherein the one or more other TRPs are associated with one or more base stations and the one or more other TRPs are configured to transmit one or more reference signals to the UE device to perform beam management procedures jointly according to the request, wherein the request includes a synchronized time for the base station and the associated one or more base stations.

Example 19 includes the subject matter of any of Examples 14-18, including or omitting optional elements, wherein the one or more reference signals sent to the UE device are synchronized and/or time multiplexed.

Example 20 includes the subject matter of any of Examples 14-19, including or omitting optional elements, wherein the UE device indicates that receive (Rx) or transmit (Tx) beams at the UE device will be swept across a plurality of antenna panels for beam management procedures.

Example 21 includes the subject matter of any of Examples 14-20, including or omitting optional elements, wherein the beam management procedure comprises independent beam management among the one or more other TRPs and the TRP when a Rx or Tx beam at the UE device is swept on the same UE antenna panel.

Example 22 includes the subject matter of any of Examples 14-21, including or omitting optional elements, wherein the beam management procedure comprises joint or coordinated management among the one or more other TRPs and the TRP when a Rx or Tx beam at the UE device is swept across a plurality of antenna panels.

Example 23 is one or more computer-readable media having instructions that, when executed, cause a base station to generate a request for a beam management procedure for a user equipment (UE) device; provide the request to one or more other transmission reception points (TRPs); generate a reference signal; provide the reference signal to the UE device according to the provided request; receive a beam state report from the UE device; and perform the beam management procedure.

Example 24 includes the subject matter of Example 23, including or omitting optional elements, wherein the beam management procedure comprises one of initial beam acquisition, transmit (Tx) beam refinement, or receive (Rx) beam refinement.

Example 25 includes the subject matter of any of Examples 23-24, including or omitting optional elements, wherein the UE device comprises a plurality of antenna panels, wherein the plurality of antenna panels each have a link to a different TRP.

Example 26 includes the subject matter of any of Examples 23-25, including or omitting optional elements, wherein the UE device is configured via RRC layer or physical layer signaling with a gap period and the UE device is configured to use the gap period to sweep one or more receive (Rx) and transmit (Tx) beams across a plurality of antenna panels associated with the one or more other TRPs.

Example 27 includes the subject matter of any of Examples 23-26, including or omitting optional elements, wherein the UE device is configured to indicate whether the gap period is needed for the beam management procedure.

Example 28 is an apparatus for a user equipment (UE) device. The apparatus includes a means to obtain a request for a beam management procedure with a plurality of transmission reception points (TRPs) at a plurality of next Generation NodeBs (gNBs); a means to coordinate the beam management procedure with the plurality of TRPs; a means to receive a plurality of reference signals simultaneously according to the obtained request; and a means to perform the beam management procedure with the plurality of TRPs based on the received plurality of reference signals and the configured measurement gap.

Example 29 includes the subject matter of Example 28, including or omitting optional elements, further comprising a means to generate a beam state report based on the received plurality of reference signals.

Example 30 includes the subject matter of any of Examples 28-29, including or omitting optional elements, further comprising a means to configure a measurement gap for sweeping receive (Rx) beams across different antenna panels.

It is to be understood that aspects described herein can be implemented by hardware, software, firmware, or any combination thereof. When implemented in software, functions can be stored on or transmitted over as one or more instructions or code on a computer-readable medium. Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Additionally, at least one processor can comprise one or more modules operable to perform one or more of the s and/or actions described herein.

For a software implementation, techniques described herein can be implemented with modules (e.g., procedures, functions, and so on) that perform functions described herein. Software codes can be stored in memory units and executed by processors. Memory unit can be implemented within processor or external to processor, in which case memory unit can be communicatively coupled to processor through various means as is known in the art. Further, at least one processor can include one or more modules operable to perform functions described herein.

Techniques described herein can be used for various wireless communication systems such as CDMA, TDMA, FDMA, OFDMA, SC-FDMA and other systems. The terms "system" and "network" are often used interchangeably. A CDMA system can implement a radio technology such as Universal Terrestrial Radio Access (UTRA), CDMA1800, etc. UTRA includes Wideband-CDMA (W-CDMA) and other variants of CDMA. Further, CDMA1800 covers IS-1800, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.18, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA1800 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the s and/or actions of a method or algorithm can reside as one or any combination or set of codes and/or instructions on a machine-readable medium and/or computer readable medium, which can be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

What is claimed is:

1. An apparatus for a next Generation NodeB (gNB), comprising baseband circuitry having:
   a radio frequency (RF) interface; and
   one or more processors configured to:
      generate a plurality of transmit beams with respective reference signals for transmission to a user equipment (UE) by the RF interface, wherein the UE has a plurality of antenna panels;
      receive a beam state report from the RF interface from the UE where the received beam state report is based on the generated plurality of reference signals, and wherein the beam state report is a matrix with:
         a plurality of first groupings related to beam reporting by antenna panel, wherein a grouping of the plurality of first groupings includes an indication of two or more of the plurality of reference signals observed by an antenna panel of the plurality of antenna panels; and
         a plurality of second groupings related to beam indication, wherein a grouping of the plurality of second groupings indicates a first transmit beam or receive beam that is to be used for communication with a first panel of the plurality of antenna panels of the UE and a second transmit beam or receive beam that is to be used for communication with a second panel of the plurality of antenna panels of the UE; and select two or more beams for communication with two or more of the plurality of antenna panels based on the received beam state report.

2. The apparatus of claim 1, wherein the one or more processors are configured to generate a beam indication based on the received beam state report and to provide the beam indication to the UE using the RF interface and/or higher layer signaling.

3. The apparatus of claim 1, wherein the beam state report includes a transmission beam index, a process identification associated with the transmission beam index and a received signal strength associated with the transmission beam index for the plurality of transmit beams.

4. The apparatus of claim 3, wherein the process identification relates to the plurality of second groupings and indicates beams observed by the UE that can be simultaneously active, where beams having different values for the process identification cannot be simultaneously active and beams with the same process identification can be simultaneously active.

5. The apparatus of claim 1, wherein the beam state report includes a transmission beam index, a group identification associated with the transmission beam index, a process identification associated with the transmission beam index, and a received signal strength associated with the transmission beam index, wherein the group identification indicates beams that can be received simultaneously by the UE and the group identification is based on the plurality of antenna panels.

6. The apparatus of claim 5, wherein the process identification indicates beams with different process identification are observed by the UE with different antenna panels which are configured not to be simultaneously active, and beams with the same process identification are observed by the UE with the same or different antenna panels which are configured to be simultaneously active.

7. The apparatus of claim 1, wherein the one or more processors are configured to regroup the matrix.

8. An apparatus for a user equipment (UE), comprising baseband circuitry having:
 a radio frequency (RF) interface configured to receive a plurality of transmit beams with respective reference signals from a base station;
 a plurality of antenna panels associated with the RF interface;
 one or more transceiver units (TxRUs); and
 one or more processors configured to:
  measure the reference signals to obtain a plurality of beam measurements;
  group the plurality of beam measurements into a plurality of first groups based on the plurality of antenna panels, wherein a group of the plurality of first groups includes an indication of two or more of the plurality of reference signals observed by an antenna panel of the plurality of antenna panels;
  group the one or more beam measurements into a plurality of second groups that are to be used to indicate a first transmit beam or receive beam that are to be used for communication with a first panel of the plurality of antenna panels of the UE and a second transmit beam or receive beam that is to be used for communication with a second panel of the plurality of antenna panels of the UE; and
  generate a beam state report based on the plurality of first groups and the plurality of second groups.

9. The apparatus of claim 8, wherein the number of the one or more TxRUs is less than or equal to the number of the plurality of antenna panels.

10. The apparatus of claim 8, wherein a group of the plurality of second groups relates to beams received at a subset of the plurality of antenna panels that are configured to receive transmissions simultaneously.

11. The apparatus of claim 8, wherein the beam state report is generated in a form of a matrix.

12. The apparatus of claim 8, wherein the beam state report includes a transmission beam index, a group identification associated with the transmission beam index, and a received signal strength associated with the transmission beam index.

* * * * *